US00RE49275E

(19) United States
(12) Reissued Patent
Michael et al.

(10) Patent Number: US RE49,275 E
(45) Date of Reissued Patent: Nov. 1, 2022

(54) SYSTEM AND METHODS FOR IMPROVED NETWORK ROUTING

(71) Applicant: Cornell University, Ithaca, NY (US)

(72) Inventors: Nithin Michael, San Francisco, CA (US); Ao Tang, San Francisco, CA (US)

(73) Assignee: Cornell University, Ithaca, NY (US)

(21) Appl. No.: 16/174,685

(22) Filed: Oct. 30, 2018

Related U.S. Patent Documents

Reissue of:
(64) Patent No.: 9,521,067
Issued: Dec. 13, 2016
Appl. No.: 14/429,660
PCT Filed: Sep. 27, 2013
PCT No.: PCT/US2013/062381
§ 371 (c)(1),
(2) Date: Mar. 19, 2015
PCT Pub. No.: WO2014/052878
PCT Pub. Date: Apr. 3, 2014

U.S. Applications:
(60) Provisional application No. 61/707,327, filed on Sep. 28, 2012.

(51) Int. Cl.
*H04L 12/26* (2006.01)
*H04L 12/801* (2013.01)
(Continued)

(52) U.S. Cl.
CPC ..... *H04L 45/123* (2013.01); *H04L 45/24* (2013.01); *H04L 47/17* (2013.01); *H04L 45/22* (2013.01); *H04L 45/48* (2013.01)

(58) Field of Classification Search
CPC ..... H04L 45/123; H04L 45/24; H04L 47/17; H04L 45/48; H04L 45/22
See application file for complete search history.

(56) References Cited

U.S. PATENT DOCUMENTS 6,091,720 A * 7/2000 Bedard ..... H04Q 3/002 370/238
6,157,648 A * 12/2000 Voit ..... H04L 12/1421 370/354

(Continued)

OTHER PUBLICATIONS

Fortz, Bernard et al., "Internet Traffic Engineering by Optimizing OSPF Weights". IEEE INFOCOM 2000. Nineteenth Annual Joint Conference of the IEEE Computer and Communications Societies.

*Primary Examiner* — Ovidio Escalante
(74) *Attorney, Agent, or Firm* — Ryan, Mason & Lewis, LLP

(57) ABSTRACT

Known intra-domain routing methods (e.g., OSPF and IS-IS) are link-state routing protocols with hop-by-hop forwarding that sacrifice optimal traffic engineering for ease of implementation and management. Known optimal traffic engineering procedures are either not link-state methods or require source routing—characteristics that make them difficult to implement. Certain embodiments of the present invention include a fully distributed, adaptive, link-state routing protocol with hop-by-hop forwarding configured to achieve optimal traffic engineering. Such embodiments facilitate significant performance improvements relative to known intra-domain routing methods and decrease network infrastructure requirements.

58 Claims, 35 Drawing Sheets

(51) Int. Cl.

| | |
|---|---|
| ***H04L 12/721*** | (2013.01) |
| ***H04L 12/707*** | (2013.01) |
| ***H04L 45/12*** | (2022.01) |
| ***H04L 45/24*** | (2022.01) |
| ***H04L 47/17*** | (2022.01) |
| *H04L 45/00* | (2022.01) |
| *H04L 45/48* | (2022.01) |

(56) References Cited

U.S. PATENT DOCUMENTS 6,201,810 B1 * 3/2001 Masuda ..... H04L 45/04 370/237
6,744,775 B1 * 6/2004 Beshai ..... H04L 45/02 370/395.31
6,976,087 B1 * 12/2005 Westfall ..... H04L 43/0852 370/238
7,130,262 B1 * 10/2006 Cortez ..... H04J 3/1617 370/216
7,581,022 B1 * 8/2009 Griffin ..... H04L 45/04 370/238
7,636,309 B2 * 12/2009 Alicherry ..... H04L 45/02 370/229
8,094,575 B1 * 1/2012 Vadlakonda ..... H04L 45/123 370/252
9,160,649 B2 * 10/2015 Kodialam ..... H04L 47/125
2004/0114569 A1 * 6/2004 Naden ..... H04L 45/08 370/351
2005/0147031 A1 * 7/2005 Bhatia ..... H04L 47/762 370/229
2005/0154790 A1 7/2005 Nagata et al.
2005/0265255 A1 12/2005 Kodialam et al.
2005/0265258 A1 * 12/2005 Kodialam ..... H04L 45/04 370/254
2007/0064702 A1 * 3/2007 Bates ..... H04L 45/02 370/392
2008/0002670 A1 * 1/2008 Bugenhagen ..... H04L 12/66 370/352
2008/0239991 A1 * 10/2008 Applegate ..... H04L 45/14 370/254
2009/0303880 A1 * 12/2009 Maltz ..... H04L 45/02 370/235
2010/0309841 A1 * 12/2010 Conte ..... H04L 45/24 370/328
2013/0308444 A1 * 11/2013 Sem-Jacobsen ..... H04L 47/125 370/230
2019/0280967 A1 * 9/2019 Chiang ..... H04W 24/04

* cited by examiner (a) Abilene (b) 4 × 4 Mesh network (c) Hierarchical 50 node network (a) Abilene (b) 4 × 4 Mesh network (c) Hierarchical 50 node network (a) Abilene (b) 4 × 4 Mesh Network (c) Hierarchical 50 Node Network (a) Abilene (b) 4 × 4 Mesh Network (c) Hierarchical 50 Node Network

SYSTEM AND METHODS FOR IMPROVED NETWORK ROUTING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED PATENTS

This application *is a reissue of U.S. application Ser. No. 14/429,660, filed Mar. 19, 2015, which* claims the benefit of U.S. Provisional Application No. 61/707,327 filed Sep. 28, 2012.

GOVERNMENT INTEREST STATEMENT

This invention was made with government support under CCF-0835706 awarded by National Science Foundation (NSF). The government has certain rights in the invention.

FIELD OF THE INVENTION

The present invention relates generally to routing items through a network.

BACKGROUND OF THE INVENTION

Networks are typically formed by one or more interconnected pathways. In a network, items may travel along the various pathways. A network may include more than one pathway from a first location to a second location. The process of selecting among the two or more pathways for the item(s) to travel is termed "routing" for the purposes of this application. Routing may be performed for many kinds of networks, including a telephone network, transportation networks, and an electronic data network (such as a local area network, wide area network, intranet, extranet, or Internet).

For the purposes of this application, the present invention is discussed in reference to routing certain types of items—specifically, information items—through certain types of networks—specifically, electronic data networks—, but the discussion is merely exemplary. The present invention is applicable to routing movement of any type of item through any type of network. For example, certain embodiments of the present invention may be configured to address other multi-commodity flow problems such as traffic engineering road networks and commodity flow in the economy.

As indicated above, certain embodiments of the present invention are directed to routing information in electronic data networks. Electronic data networks may be comprised of at least a group of two or more nodes. An example of a node is a physical electronic device (e.g., a router, computer, or switch). A node also may be a virtual manifestation of such a device. For the purposes of this application, the term "node" is interchangeable with the term "router".

Typically, information is transferred between nodes in a formatted unit of data, such as a packet, byte, character, datagram, or bit. Certain embodiments of the present invention will be discussed with reference to transfer of information packets, but this discussion is non-limiting and merely exemplary. Generally, any formatted unit of data may be transferred among nodes according to the present invention, or more generally, any commodity may be transferred along pathways in a network.

An information packet may be routed from a source node to a destination node. More specifically, the information packet may travel from a source node directly to a destination node or may travel from a source node to one or more intermediate nodes and then reach a destination node. For the purposes of this application, the portion of the route between each node and a second node is termed a "link".

The specific nodes through which the information packet travels—which form the "pathway"—may be selected based on some criteria, such as shortest distance between source node and destination node or most bandwidth availability along the pathway. Certain criteria information—e.g., distance between certain nodes—may be obtained and stored in a storage component. Examples of a storage component include a routing table, a topology map, a main memory, or secondary memory (the latter two of which are described in more detail below).

In certain embodiments, each node has its own storage component, which contains information regarding that node's links to other nodes. For example, a storage component for a single node may include the information such as the distance between that single node and each other neighboring node. For the purposes of this application, a "neighboring node" is a node to which a source node can directly transfer information without need for an intermediate node.

Various procedures for routing information packets through the pathways of an electronic data network existed before the present invention. Certain types of earlier known routing procedures are called "link-state routing procedures". Such procedures are configured to select pathways for the information packets based on the state of the links between nodes. For purposes of this application, the term "link state" refers to a numerical description of the state of the link. It could be a number 1 to indicate a functioning link vs. a number 0 to indicate an inactive link. In another embodiment, the link state could be a valuation of the amount of traffic on the link.

Typically, the shortest distance between a source node and each other node in the network is calculated. The distance may be considered a "price" for the purposes of the calculation. A higher distance has a higher price, and a shorter distance has a lower price. The procedure may seek to minimize the overall price of the set of links that form the pathway. Then, when an information packet travels through the selected pathway, it does so by traveling the shortest distance.

However, such procedures have certain disadvantages in that the pathway with the shortest distance may not be the most efficient pathway. For example, the most efficient pathway may get overburdened and become unable to support the quantity of information packets routed through that pathway. Accordingly, more advanced systems and methods added additional criteria to calculate the "price" of the respective links and overall pathway. For example, such criteria may include available bandwidth between nodes, expected delay in communicating between nodes, pathway reliability, or pathway availability.

In certain known procedures, the route for the information packet is re-analyzed at each node. For example, at a source node, an evaluation is done to assess the "lowest price" second node in light of the ultimate destination node. A second assessment is done at the second node to determine the "lowest price" subsequent node in order to reach the destination node. The analysis is done at every subsequent node until the information packet reaches the destination node. This type of process is called "hop-by-hop" routing because a separate analysis is done relative to each node to determine each subsequent "hop" over a link.

Each network may include more than one packet travelling through the system. In the analysis step done at each node (in systems using the hop-by-hop approach), the selection of which packets or how many packets follow which pathway through which nodes is termed a "split ratio".

Generally, the "hop-by-hop" routing procedures are limited in that they do not always achieve the optimal route over the entire pathway. For example, in the network illustrated in FIG. 1, if node A is the source node and node D is the destination node, the analysis at node A includes an assessment whether node B or node C has a lower price. The price of the link between node A and node B is rated 4, while the price of the link between node A and node C is rated 10. Accordingly, the analysis will identify node B as the lowest price subsequent node. Then, the analysis at node B will identify node D as the best subsequent node. The overall price will be 18 (calculated by adding link price A-B, 4, and the price of link B to D, 14). However, if the analysis at node A could have all the information about the network analyzed appropriately, it would have calculated that the route from node A-C-D actually has a lower price of 16—calculated by adding A-C Link price of 10 plus C-D Link price of 6—relative to the A-B-D price of 18. The route A-C-D would have optimized the objective of using the lowest price route over the entire network.

In general, "optimized" or "optimal" routing procedures may include a method configured to achieve the most efficient mathematically/physically possible result for any identified objective (e.g. minimize total delay, maximize use of network resources, minimize distance traveled) or combination of objectives determined by a network operator. Alternatively, the objectives may be prioritized by the system either in real-time as the system is processing the routes or by a list of priorities identified before the route processing begins. The problem of optimizing network traffic is termed "traffic engineering" or "TE" for the purposes of this application.

Overall, known routing procedures configured to achieve optimal or near-optimal traffic engineering over a network are associated with many disadvantages. In general, such procedures are typically difficult to implement or manage and may not take into account any change in the conditions of a link in the network. (The ability to recognize and respond to changes in the state of the link or state of the network is called being "adaptive". More specifically, an "adaptive" routing method is configured to recognize and respond to changes in the state of the network such as the traffic demand of the commodities or packets—as recognized from the input to the method—automatically.) Certain known routing procedures and their respective disadvantages are discussed below.

An alternative to "hop-by-hop" routing is termed "source routing", in which the entire route from the source node to the destination node is calculated by the source node. Source routing can be difficult to implement, because the source node has to encode, in the information packet, the entire pathway that it must take through the network. This could potentially be more information than the payload of the packet.

Examples of source routing include the flow deviation technique, the gradient projection approach, and proximal decomposition methods. However, these optimization procedures require the network to establish end-to-end virtual circuits or to encode the entire pathway each packet should take at the origin of that packet. As the traffic patterns change, the established circuits become less useful and performance levels decrease.

Instead of using source routing, efforts have been made to improve the optimality of traffic engineering in known hop-by-hop link-state procedures. For example, techniques have been shown to improve the performance of certain hop-by-hop link-state procedures—e.g., Open Shortest Path First (OSPF)—significantly by finding better weight settings for the procedure. However, the results are still far from optimal traffic engineering. Typically, these efforts also assume that a good estimate of the traffic demand in the form of a traffic matrix is available. For the purposes of this application, a "traffic matrix" is a matrix representation of the current traffic demand between the nodes in a network. While work has been done on traffic matrix estimation, even the best results have errors in the elements of the estimated traffic matrix on the order of 20%—difficulties which can lead to potentially bad traffic engineering.

Oblivious routing has been proposed to circumvent the need for estimating the traffic matrix for improved traffic engineering. Such procedures seek to perform well regardless of the traffic demand by comparing the 'oblivious performance ratio' of the routing, i.e., the worst case performance of the routing for a given network over all possible demands. Examples of such procedures are a linear programming method to determine the best oblivious routing solution for the special case of minimizing maximum channel utilization and another procedure configured to maximize throughput for the special case of two phase routing. Some clear limitations of these procedures are that the oblivious routing solutions do not adapt well to changes in the network topology and that, by not taking advantage of actual traffic information, the routing still incurs possibly significant performance losses.

Other hop-by-hop routing procedures are based on distance-vector methods. Distance vector methods call for each router to send all or some portion of its routing table to other nodes, but only to its neighboring nodes.

As long as a node has access to the "average price" (e.g., "average distance") to each destination at each of its neighbors, such as the averages calculated in Equation 1 below, it has enough information to make optimal forwarding decisions. From an optimization standpoint, the main ideas follow directly from the decomposition of the dual of the traffic engineering optimization problem. Such decompositions, which have been very successful for problems of this type, can be used to yield updating rules for both primal and dual variables (split ratios and node prices) that can be shown to converge to optimal solutions. Similar node-based ideas have also been applied to cross-layer optimization of networks.

However, such distance-vector procedures are often difficult to scale up in large networks and lack robustness. More specifically, in one example of the lack of robustness in distance-vector systems, one router started advertising to its neighboring nodes that it has essentially zero distance to all destinations. The neighboring nodes started shifting traffic to this router followed by the neighboring nodes' respective neighboring nodes. Eventually the router went down under the traffic load but many routers in the Internet were still pointing or trying to point towards this router.

Also, distance-vector procedures can converge slowly as packets need to be passed in a step-by-step manner from one end of the network to another for route computations to take place.

Clearly, there are challenges associated with implementing procedures configured to provide optimized traffic engineering in a network. While procedures have been developed to implement optimized procedures of certain portions of a network, the challenges associated with scaling such procedures to appropriate size for certain networks has limited the usefulness of such procedures.

Accordingly, hop-by-hop link-state routing procedures that are not optimized are commonly used in many networks, despite not resulting in optimal use of network resources. Examples of such non-optimized procedures include the Open Shortest Path First (OSPF) procedure and the Intermediate System—Intermediate System (IS-IS) procedure. Such procedures are relatively easy to implement, manage, and scale up, and, accordingly, have been widely applied, but lack optimality.

Clearly, there is a demand for a hop-by-hop, link-state, traffic-optimal routing system and methods for routing items through a network. The present invention satisfies this demand.

SUMMARY OF THE INVENTION

Certain embodiments of the present invention include a system and methods for routing items through a network. Generally, the problem of how to route items through a network is considered a multi-commodity flow problem (MCF). The Karush-Kuhn-Tucker (KKT) conditions of the MCF problem are what permit focusing on shortest paths based on the price and to show optimality of the method.

Certain embodiments of the present invention are configured to implement an adaptive, traffic-optimized, hop-by-hop, and link-state approach to solving the MCF problem in a network.

Advantageously, since the hop-by-hop approach is incorporated, the system does not have to set up virtual circuits, end-to-end tunnels or encode the pathway the packet should follow at the origin. By optimizing the traffic, some criteria or combination of criteria—e.g., speed, reliability, or availability of the path is maximized or minimized for the network or some portion of the network.

Advantageously, since the link-state approach is incorporated, each node has access to the state of each link and a single node cannot take down the network as with distance-vector implementations. There are two efficient ways to calculate the shortest path through the network: using a link-state implementation or a distance-vector implementation. Given the disadvantage of distance-vector, the link-state approach is preferred.

Certain embodiments of the present invention are also adaptive, and accordingly, configured to receive and process information regarding the changing state of links among nodes in the network.

In certain embodiments, the system and methods of the present invention may be configured to implement the method in a "distributed" manner. More specifically, given the link-state information, each router may independently perform the relevant computations. However, this is a feature and not a requirement. The same calculations could be performed at any place with access to all the local node information such as the inflow rate and the split ratios.

Certain embodiments of the present invention include routing more than one information packet through a pathway in the network. In such embodiments, the optimal routing may include sending all the packets on the same pathway through the network—termed "single-path routing"—or sending certain packets on different pathways through the network—termed "multi-path routing". An optimal solution typically uses multiple paths between the source node and the destination node.

Certain embodiments of the present invention are configured to be implemented on a network running various types of routing systems and methods. Such embodiments may be configured to co-function with one or more single-path routers or multi-path routers in the same network. In other words, each router in a network may be configured to implement a routing method according to the present invention or routing methods outside the scope of the present invention. Advantageously, even if the system and methods of the present invention is implemented in only a portion of the routers in a network, the performance of the network improves.

Certain embodiments of the present invention is configured to be "iterative", which means that the system and methods are configured to dynamically adjust the traffic forwarding successfully at each node to seek the most optimal pathway.

The system may be understood by comparison to an example of another type of network—that is, a road network during rush hour. Each driver may intend to drive their car from work to home, which is comparable to an information packet that needs to go from a source node to a destination node. Car drivers typically prefer to use the shortest path back home to minimize their commute. However, at rush hour there are many car drivers following the same strategy. Consequently, the major expressways get overcrowded and backed up, even though under non-rush hour circumstances those expressways would have indeed represented the fastest path for each driver to get home.

During rush hour, drivers may tune in to the radio and listen to the traffic report detailing the status of different roads that they can take to their destination. The traffic report is comparable to the "link states" in embodiments of the present invention. Then, the car driver adaptively chooses which road to take at each junction of certain roads ("hop-by-hop" in the present invention) based on the incoming radio report so that they can get home quickly. Since multiple drivers are likely getting the same road traffic reports, a lot of car drivers might all choose to leave the expressway and take back roads to their destinations, which only makes traffic and delay significantly worse on those back roads. In the present invention, this problem is managed by a method step that splits the traffic at junctions based on their destination so that not everybody piles onto the same alternative route. The exact splits are determined iteratively and dynamically to optimize the traffic flow based on the traffic conditions reported via the radio reports/link states.

As discussed above, many networks, including the Internet already use link states (e.g., comparable to the radio traffic reports). Specifically, OSPF, which controls routing on over 95% of the Internet, relies on these link-state updates. However, OSPF relies on reports that include pre-computed weights that are operator specific. The weights may be an inverse of the link bandwidth, or some number assigned based on statistical/historical knowledge of the traffic conditions on the link.

In contrast, certain embodiments of the present invention use reports improved relative to the OSPF reports. For instance, one type of improved report may indicate the number of packets (e.g., cars in the road example) between two junctions (e.g., intersections in the car example), while another type of improved report may indicate the number of packets per unit of distance (or cars per mile) between two junctions. Each report conveys different information. In the present invention, the link-state is reported to achieve optimal performance.

In general, certain embodiments of the present invention include a number of method steps. A method may begin with ascertaining one or more links between two nodes in a network. A price value may be assigned to each link between the one or more nodes. The price value of the respective links may be shared among certain or all nodes in the network. When the system receives a request for routing one or more packets through the network, the optimal subsequent node (i.e., next hop) for each packet may be calculated. The calculation is repeated at each subsequent node until the destination node is reached. In certain embodiments, each node includes its own processor and main memory (each of which is described in more detail later in the application) configured to implement the entire method. In other embodiments, certain steps are done in one processor and information about those steps is communicated to processors in one or more nodes.

One object of certain embodiments of the present invention is improved performance relative to known procedures for optimized traffic engineering.

Another object of certain embodiments of the present invention is improved performance by upwards of 1000% relative to known procedures for optimized traffic engineering.

Another object of certain embodiments of the present invention is easier implementation of the system and methods relative to known procedures for optimized traffic engineering.

Another object of certain embodiments of the present invention is easier management of the system and methods relative to known procedures for optimized traffic engineering.

Another object of certain embodiments of the present invention is improved overall traffic engineering relative to known hop-by-hop procedures, link-state procedures, or hop-by-hop & link-state procedures.

Yet another object of certain embodiments of the present invention is that it does not require estimating a traffic matrix.

Yet another object of certain embodiments of the present invention is that it does not require source routing.

Yet another object of certain embodiments of the present invention is easier scalability, e.g., scaling up or scaling down as needed for the size of a network, relative to known procedures.

Yet another object of certain embodiments of the present invention is to use the same inputs used in OSPF or IS-IS to facilitate easier transition between networks currently utilizing OSPF or IS-IS procedures.

A difference between certain embodiments of the invention and existing link-state procedures is an argument for how to control the ratio according to which an internet router splits traffic to a destination across its outgoing links. Since it needs no additional input and can work with existing infrastructure, implementing embodiments of the invention would include modifying the component of the router running OSPF to run such embodiments of the invention. For practical implementation, a discrete-time version of the continuous-time argument is necessary. However, since the continuous time argument has been shown to be valid, it is only a question of selecting a small enough step-size to implement the present invention. In other words, the step-size includes using discrete time steps instead of continuous time. A digital implementation requires time steps to operate, whereas an analog implementation does not require time steps to operate. Since computers are digital, discrete time steps are typically required.

In certain embodiments, the invention can be distributed as a software service, a hardware component configured to implement the method, or as a full-scale router.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION OF EMBODIMENTS OF THE INVENTION

Figure 1:
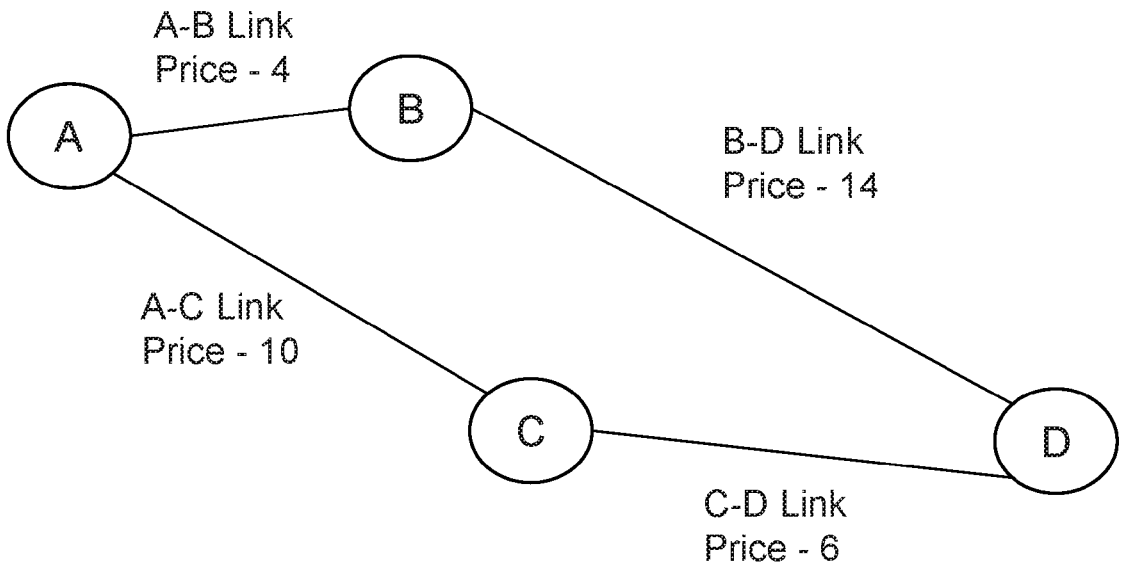
Prior Art FIG. 1
FIG. 1 illustrates an example of a network.

The question of how to route information packets through an electronic data network can be defined more generally as a multi-commodity flow ("MCF") problem. For a given directed graph, G=(V,E) with node/router set V and edge/link, set E with link capacities $c_{u,v}$; ∀ (u,v)∈E, and demands D(s,t) defined as the rate required for communication from s to t, the MCF problem can been summarized below.

$$\min_{f^t_{u,v}} \Phi(f)$$

$$\text{s.t.} \sum_{v:(s,v)\in E} f^t_{s,v} - \sum_{u:(u,s)\in E} f^t_{u,s} = D(s,t),\ \forall\, s \neq t$$

-continued $$f_{u,v} = \sum_{t\in V} f^t_{u,v} \le c_{u,v},\ \forall\, (u,v)$$

$$f^t_{u,v} \ge 0$$

Commodities are defined in terms of their final destination t. $f_{u,v}{}^t$ is the flow on link (u,v) corresponding to commodity t and $f_{u,v}$ is the total flow on link (u,v). The cost function, Φ, is typically selected to be a convex function of the link rate vector $f=\{f_{u,v}\}$, ∀ (u,v)∈E. For example, if the M/M/1 delay formula is used for the cost function, then $\Phi(f)=\Sigma_{u,v}\Phi_{u,v}(f_{u,v})=\Sigma_{u,v} f_{u,v}/(c_{u,v}-f_{u,v})$. Throughout this application, this cost function will be used unless specified otherwise. It is also assumed that $\Phi'_{u,v}(f_{u,v})\to\infty$ when $f_{u,v}\to c_{u,v}$. This element captures the common practice of not allowing links to operate too close to their capacity. For the purposes of this application, given a function $\gamma(\chi(\tau))$, the character $\gamma'$ to represent the derivative of χ with respect to χ and $\dot{\gamma}$ to represent the time (τ) derivative of γ.

Using the first derivative of the cost function as the price of a link in distance calculations permits the achievement of an optimal solution. The price of the link (u,v) is defined as $w_{u,v}=\Phi'_{u,v}(f_{u,v})$, the price of a path p as $\Sigma_{u,v\in p} w_{u,v}$ and the price at a node u to a destination t as, $$q^t_u = \sum_{v:(u,v)\in E} \alpha^t_{u,v}[w_{u,v} + q^t_v] \tag{1}$$

where $q_t{}^t=0$. The price at a node can be interpreted as the average price to the destination from that node where the average is taken over all outgoing edges to the destination weighted by the split ratios along those edges. If instead the average is done over all possible paths, Equation (1) can be stated without recursion as, $$q^t_u = \sum_{p\in P_{u,t}} d_p \prod_{(i,j)\in p} \alpha^t_{i,j} \tag{2}$$

where $P_{u,t}$ is the set of paths from u to t and $d_p=\Sigma_{(u,v)\in p} w_{u,v}$.

As identified above, the selection of which packets or how many packets follow which path through which nodes is termed a "split ratio". A split ratio may be determined for each commodity (e.g., information packet) at every node. More specifically, each router's split ratios are adjusted and traffic is moved from one outgoing link to another. Such embodiments only control the next hop on a packet path, which is hop-by-hop routing. If the entire path rate was controlled, the system would be using source routing. Also, the split ratio determination may include favoring links that form the shortest pathway, even though the average price via the next hop node may not be the lowest. If the lowest average price was prioritized, this is termed "Gallager's approach", which is a distance vector solution (Gallager's approach is compared with an embodiment of the present invention in FIG. 3. The dashed line represents Gallager's approach and the solid line represents an embodiment of the present invention.)

In addition, the split ratio determination may include adapting the split ratios dynamically and incrementally by decreasing the packet traffic along links that belong to non-shortest paths while increasing along the link that is part of the shortest path at every router. In contrast, if split ratios are set to send packets only to the links leading to the currently calculated shortest path, then the result is OSPF with weights, $w_{u,v}$.

Figure 2A:
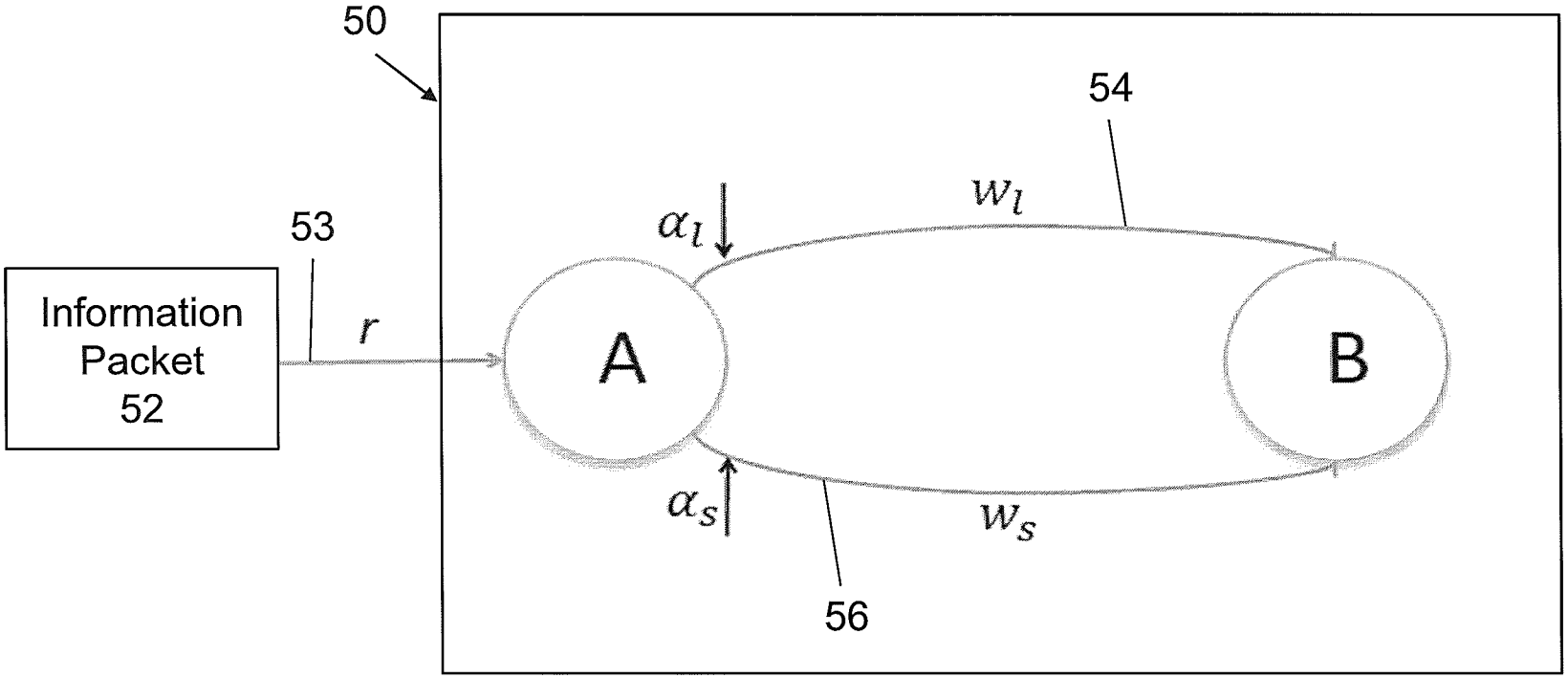
FIG. 2A illustrates an example of a network having two nodes according to the present invention.

Certain portions of certain embodiments of the present invention are configured to address specific scenarios that may occur in a network. One scenario is illustrated in FIG. 2A. One or more information packets 52 are available for routing through the network 50. The rate of demand 53 for routing information packets 52 may be represented by "r". Upon reaching node A, the one or more information packets 52 may be sent along a first link 54 or a second link 56. In the illustrated embodiment, the first link 54 has a more expensive "price" according to some criteria (e.g., longer distance, lower reliability, etc.). The more expensive price is represented by the character "$w_l$". The second link 56 has a less expensive price and is represented by the character "$w_s$".

Given $w_l>w_s$, a strategy to reach optimal use of the first link and the second link might be to dynamically shift traffic from the more expensive link to the cheaper link at some rate $\delta>0$ until the prices of the two links become the same. The split ratio for the first link 54 at node A is represented by $\alpha_l$ and the split ratio for the second link 56 is represented by $\alpha_s$. In certain embodiments, the traffic over the first link 54 is decreased and traffic at the second link is increased. The $\alpha_l$ value may be decreased while the $\alpha_s$ value is increased at rate $\delta/r$. In such embodiments, the first link price is $w_l=\Phi_l'(\alpha_l r)$ and the second link price $w_s=\Phi_s'(\alpha_s r)$.

There are at least two ways to interpret and generalize the intuition gained from this scenario. Both give the same solution for this very simple example but in general will lead to different dynamics and possibly different split ratios. One interpretation, which forms the basis of procedures used in certain known methods, is that the router shifts traffic headed to neighbor nodes with higher average price to the neighbor node with the lowest average price.

A second interpretation, which is the basis of certain embodiments of the present invention, is that the router shifts traffic from links along more expensive paths to the link along the path with the lowest price. Mathematically, the following update rule for the split ratios is:

$$\dot{\alpha}_{u,v}^{t} = -\frac{\delta}{r_u^t} \tag{3}$$

where $(u, v)\epsilon E$ but is not on the shortest path from u to destination t and $r_u^t$ is the incoming rate at node u at destination t.

Figure 2B:
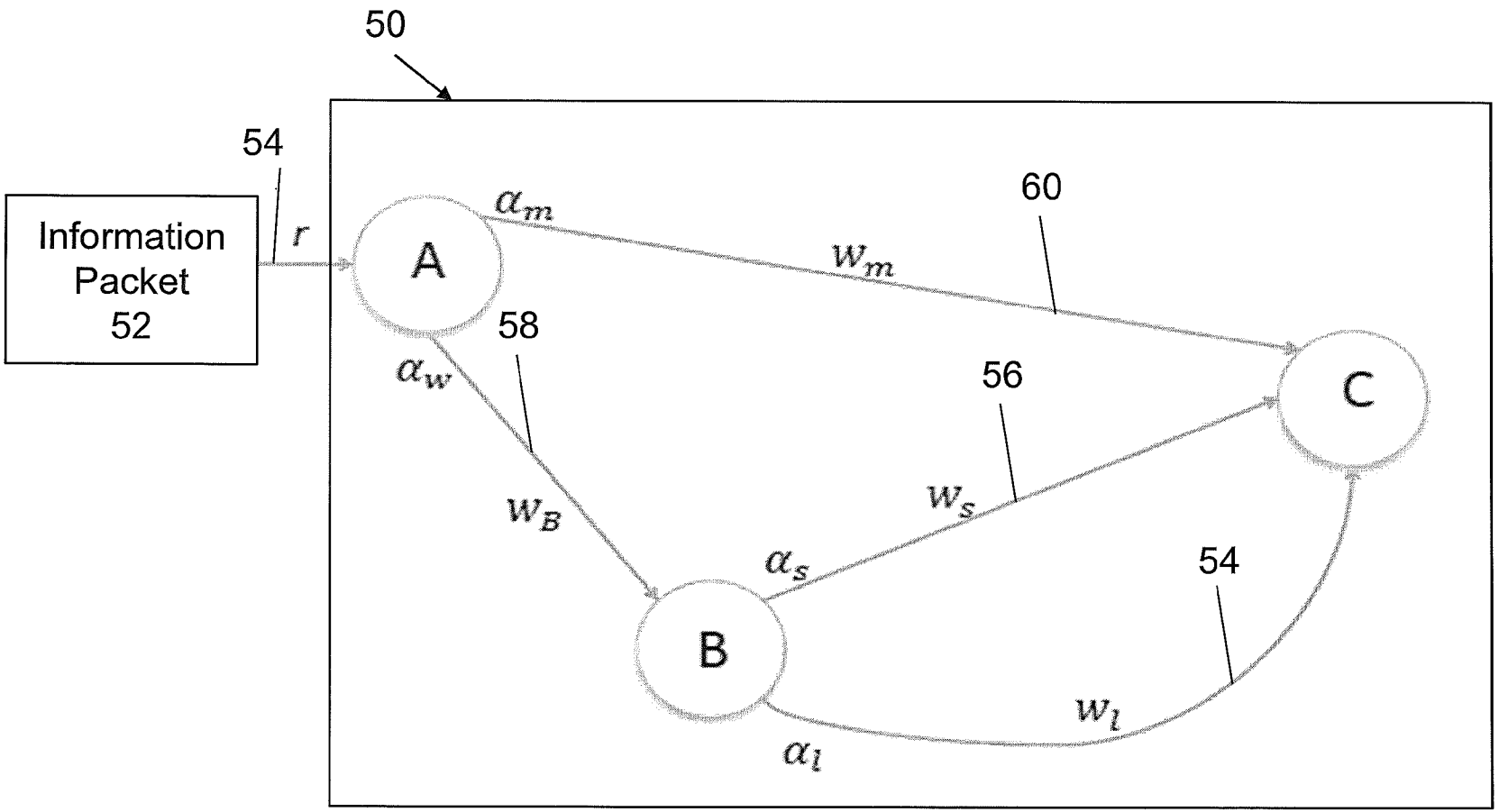
FIG. 2B illustrates an example of a network having three nodes according to the present invention.

However, as a potential counter-example to this interpretation, some version of the scenario described in FIG. 2B may be relevant. FIG. 2B illustrates traffic demand of rate r from node A to node C. In the network, there is a first node (node A), a second node (node B), and a third node (node C). There is a first link 54 between node B and node C, a second link 56 between node B and node C, a third link 58 between node A and node B, and a fourth link 60 between node A and node C. The initial splits at node A are represented by $\alpha_m$ for the fourth link along an intermediate price link with price $w_m$ and $a_w$ along the more expensive route with price $w_B+w_l$ for the third link, assuming $a_l=1$ initially. The relationship between the initial link prices are assumed to be $w_l>w_m>w_s+w_B$, i.e., the third link (A,B) is along the shortest path from node A to node C, but node B also has the most expensive way to reach node C. The concern is that, if node A shifts traffic from the intermediate price link to the link with price $w_B$, the cost might increase as node B currently routes traffic only through the most expensive link ($\alpha_l=1$). But because the selection at node B decreases $\alpha_l$ and increases $\alpha_s$ (in conjunction with the changes at node A), the total cost does in fact decrease. More precisely, the cost derivative can be calculated as follows, $$\dot{\Phi} = -r\times\frac{\delta}{r}\times w_m + r\times\frac{\delta}{r}\times(w_B+w_l) - r_B\times\frac{\delta}{r_B}\times w_l + r_B\times\frac{\delta}{r_B}\times w_s = -\delta(w_m - w_B - w_s) \le 0$$

where $r_B$ is the incoming rate to C at B and the inequality follows from the relationship between the prices.

Figure 3:
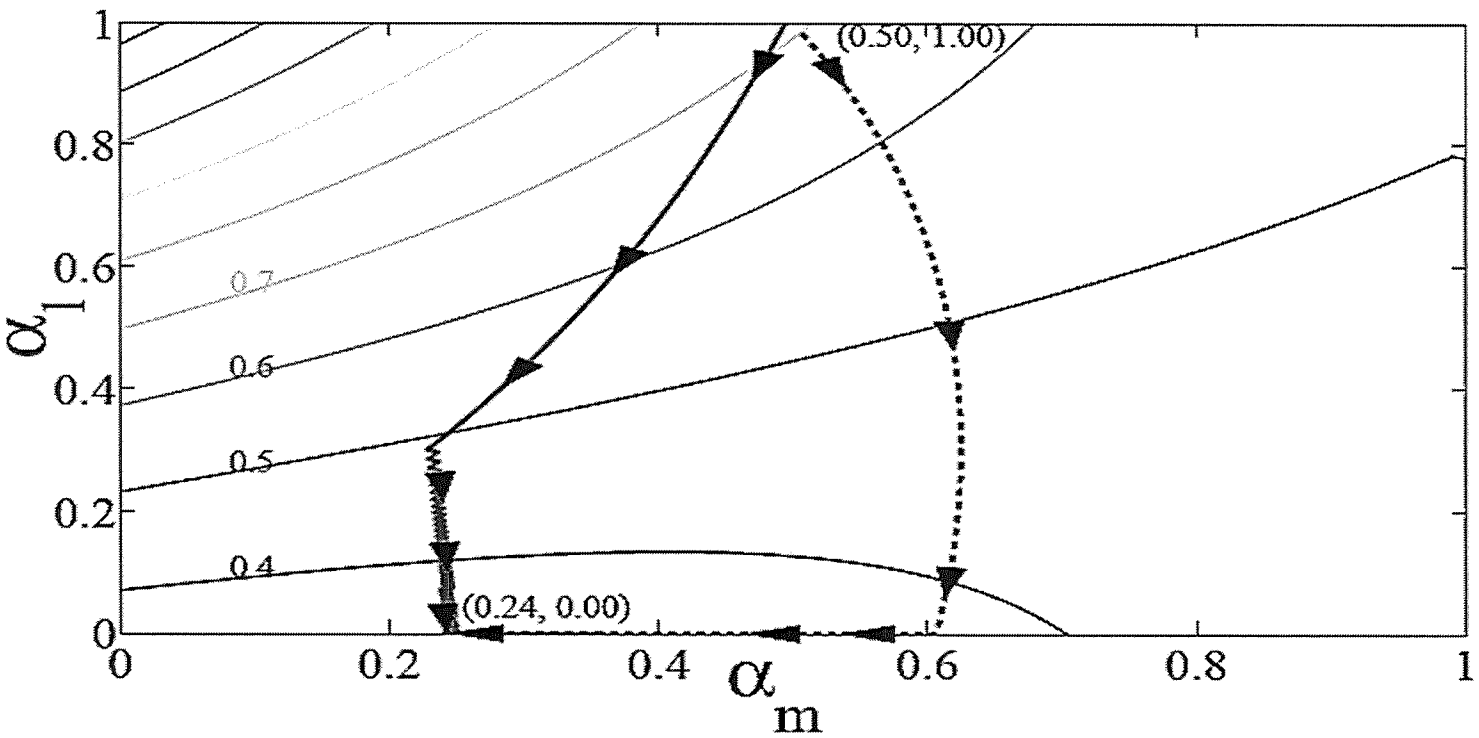
FIG. 3 illustrates a comparison of an embodiment of the present invention with Gallager's distance-vector approach known in the art.

The scenario illustrated in FIG. 2B can be used to illustrate the difference between certain embodiments of the present invention and Gallager's technique which arises from the fact that the link leading to the neighbor with the lowest average price (path A-C with price $w_m$) may not lead to the cheapest path (path A-B-C with price $w_B+w_s$). FIG. 3 shows the trajectories taken by the two different methods to converge to the optimal solution for the illustrated topology. To simulate the long link between node B and node C, an intermediate dummy node D may be introduced that splits the bottom link between B and C into two equal capacity links. The capacities used could be (A,B)=5, (B,C)=10, (A,C)=(B,D)=(D,C)=3. The single demand is D(A,C)=r. The rate r=1 and initially $\alpha_w=\alpha_m=0.5$ and $\alpha_l=1$. At each node, the split ratios to a given destination have to add up to the value 1. Accordingly, only one split ratio is calculated at each node because the value of that split ratio automatically defines the value of the other at each node. Using Gallager's method, initially, as can be seen, following the lowest average price path to the destination (A,C), there is an increase in the value of $\alpha_m$. Also, the trajectory of the method (gradient descent) is perpendicular to the objective function contour curves. On the other hand, using an embodiment of the present invention, both split ratios are decreased initially. The trajectory based on an embodiment of the present invention is usually not perpendicular to the contour curves, which represent the cost of the network. However, the trajectory still goes along a descent direction and drives the total cost down.

Figure 2C:
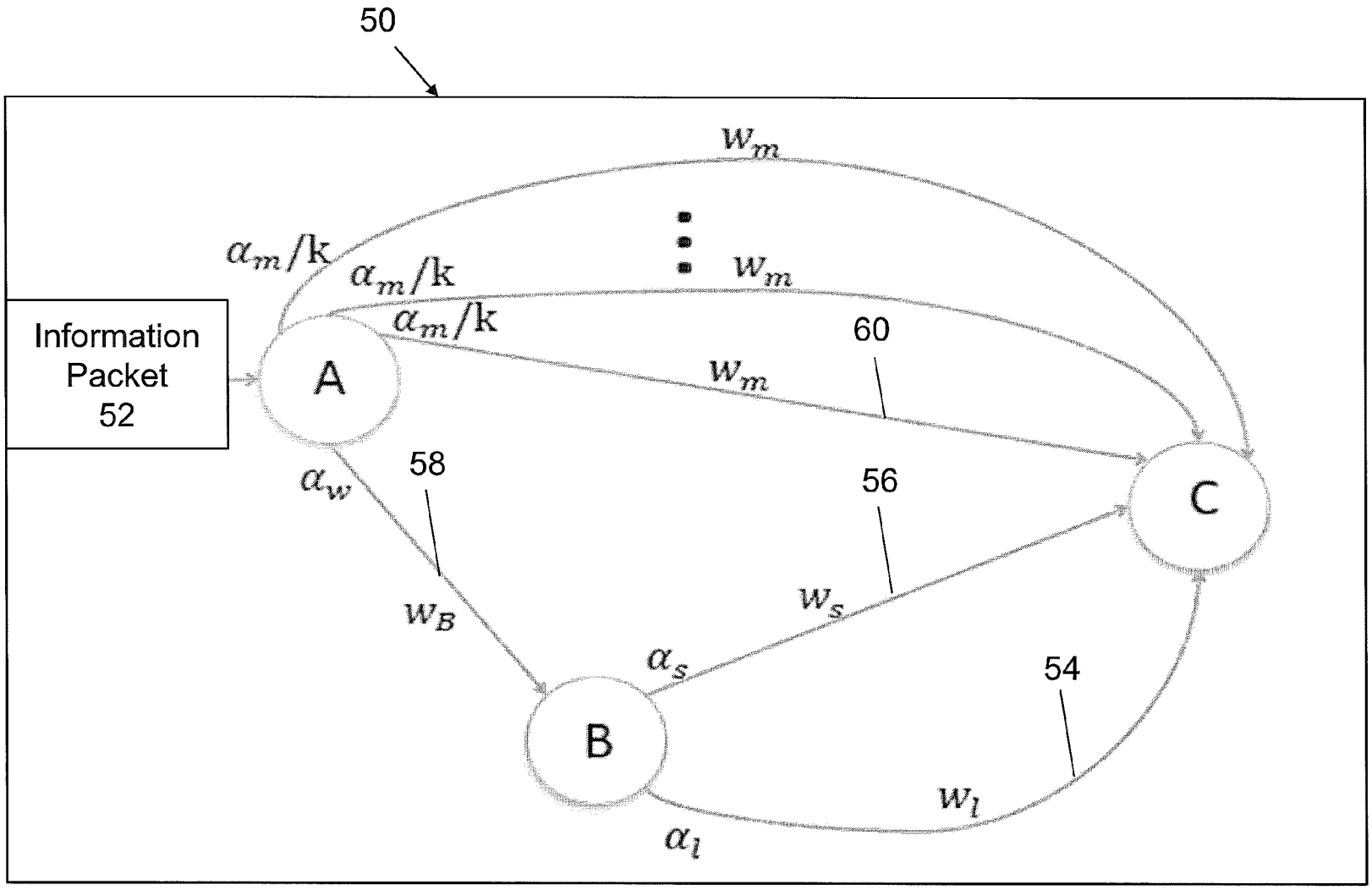
FIG. 2C illustrates another example of a network having three nodes according to the present invention

The scenario illustrated in FIG. 2C is configured to exemplify why Equation 3 is not sufficient to decrease network cost along any trajectory. FIG. 2C illustrates k intermediate price links from router A to router C, each of which gets $\alpha_m/k$ fraction of the demand. The relationship between the link prices is the same as in the example illustrated in FIG. 2B. The shifting of traffic in an unrestricted fashion from the intermediate price links to router B with $\alpha_l=1$, might result in an increase in the cost. The following calculation shows how the cost may increase.

$$\Phi = -k\times r\times\frac{\delta}{r}\times w_m + k\times r\times\frac{\delta}{r}\times(w_B+w_l) - r_B\times\frac{\delta}{r_B}\times w_l + r_B\times\frac{\delta}{r_B}\times w_s = -k\delta w_m + \delta(kw_B + w_s) + (k-1)\delta w_l$$

which may be positive for k>1. Accordingly, to avoid increasing the cost, a weighting factor of the split ratio itself is added to the Equation below.

$$\dot{\alpha}_{u,v}^{t} = -\frac{\alpha_{u,v}^{t}\delta}{r_u^t} \tag{4}$$

where (u, v)∈E, but is not on the shortest path from u to destination t.

With the new rule (Equation 4), the cost derivative can be evaluated as follows.

$$= -k \times r \times \frac{\delta\alpha_m}{rk} \times w_m + kr \times \frac{\delta\alpha_m}{rk} \times (w_B + w_l) - r_B \times \frac{\delta}{r_B} \times w_l + r_B \times \frac{\delta}{r_B} \times w_s = -\delta[\alpha_m w_m + (1-\alpha_m)(w_B + w_l)] + \delta(w_B + w_l) - \delta w_l + \delta w_s = -\delta[\alpha_m w_m + (1-\alpha_m)(w_B + w_l)] + \delta(w_B + w_s) \le 0$$

Where the last inequality follows from the fact that the average prices from router A to router C, which is $\alpha_m w_m + (1-\alpha_m)(w_B+w_l)$ has to be at least as large as the price of the shortest path from A to C, which is $w_B+w_s$.

Figure 2D:
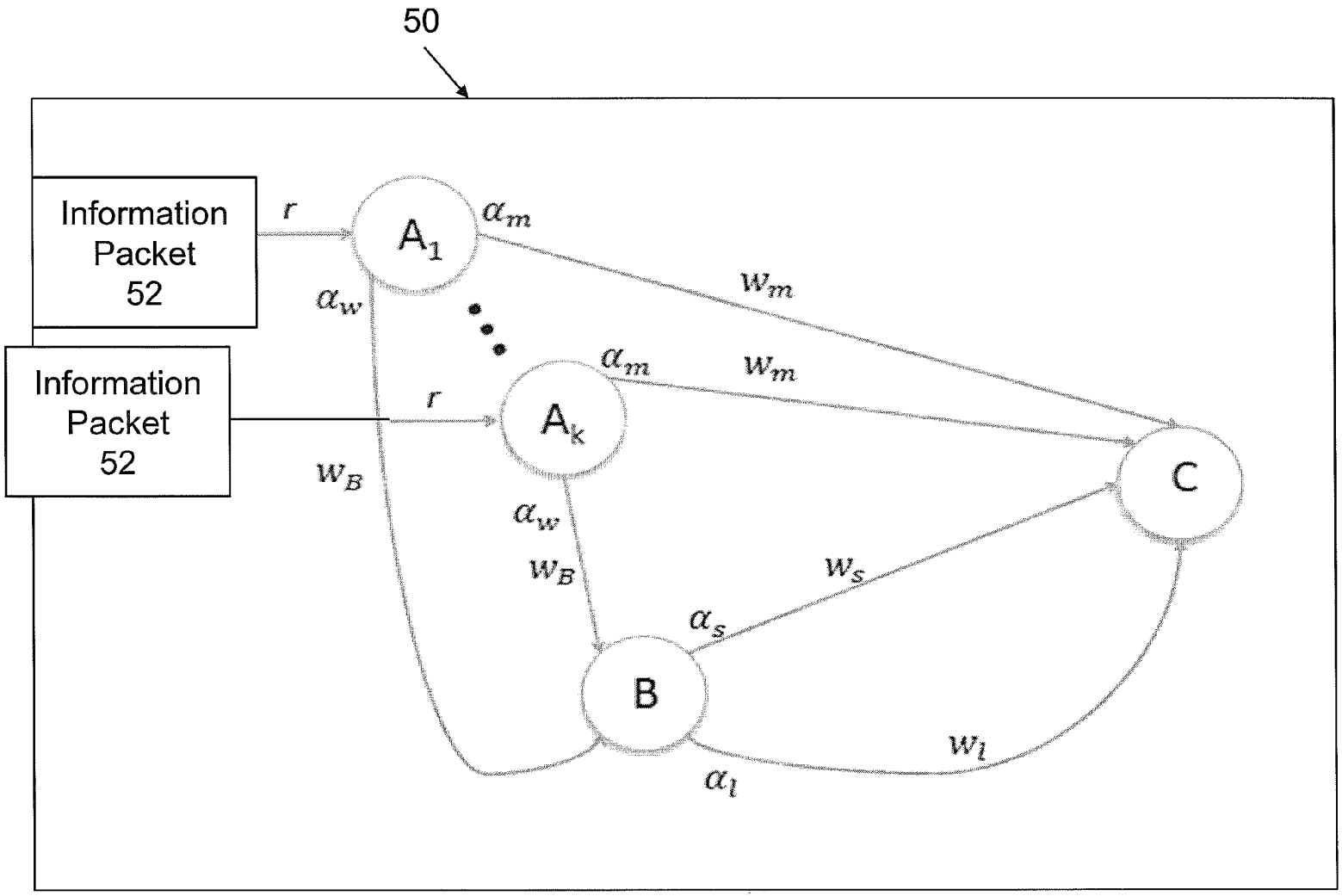
FIG. 2D illustrates an example of a network having a plurality of nodes according to the present invention.

Additional adaptations to the Equation 4 can be made to improve the likelihood that its application will result in a decrease in cost of the network. The scenario in FIG. 2D includes multiple inputs. The link weights as illustrated are $w_l > w_s > w_s + w_B$. In the illustrated embodiment, there are k sources (e.g., demands $D(A_i, C)=r$, $I=1, \ldots, k$) that have information packets to be sent to node C. Shifting traffic in an unrestricted manner from all the sources to router B with $\alpha_m=1$ may cause the total cost to increase as shown by the calculations below.

$$\dot{\Phi} = -k \times r \times \frac{\delta\alpha_m}{r} \times w_m k \times r \times \frac{\delta\alpha_m}{r} \times (w_B + w_l) - r_B \times \frac{\delta}{r_B} \times w_l + r_B \times \frac{\delta}{r_B} \times w_s = -k\delta[\alpha_m w_m + (1-\alpha_m)(w_B + w_l)] + (k-1)\delta w_l + \delta(k w_B + w_s)$$

which may be positive for $k>1$.

Once again it is possible to modify the rule for the split ratios from $\delta\alpha_{u,v}^t/r_u^t$ to $\delta\alpha_{u,v}^t/\eta_u^t r_u^t$. In certain embodiments, the $\eta_u^t=k$ while for a general network, $\eta_u^t$ may be calculated according to a method specified later in this application. The calculation for determining the routing of information packets is updated to:

$$\dot{\alpha}_{u,v}^t = -\frac{\alpha_{u,v}^t \delta}{\eta_u^t r_u^t} \tag{5}$$

where (u, v)∈E, but is not on the shortest path from u to destination t.

Overall, embodiments of the present invention results in split ratios for all the links converging to a set where every element of the set achieves the global optimum to the MCF problem and accordingly achieves optimal traffic engineering for the network. To illustrate, a few more notations are defined below.

For a particular destination t at node s, $$r_s^t = \sum_{u:(u,s)\in E} f_{u,s}^t + D(s, t)$$

the inflow rate to a node s destined to t, which, because of node flow balance requirements is also the outflow at s to t. The character α is also used without indexing to represent the set of all the split ratios from all the routers in the network. At a router u, $\alpha_{u,v}^t$ controls the fraction of traffic to destination t that uses outgoing link (u, v) while satisfying $\alpha_{u,v}^t \ge 0$ and $\Sigma_{v:(u,v)\in E}\alpha_{u,v}^t=1$.

Branch cardinality is used to make sure that nodes that are farther away from a destination node are more conservative in how much traffic they shift to the shortest path leading to the destination. As noted earlier, if nodes simply shifted a large percentage or all of their traffic to the shortest node, the performance of the network would be poor. OSPF is an example of the latter. The characters $\eta_u^t$, which represent the branch cardinality, are defined as the product of the number of branches encountered in traversing the shortest path tree (e.g., route) rooted at t from t to u. Being a link-state routing method, each node u has the link-state information to run Dijkstra's method to compute the shortest path tree to destination t. Every node has to independently determine the same shortest path tree to permit the method to proceed as desired. At any stage of Dijkstra's method, if there is ambiguity as to which node should be added next, tie-breaking based on node index is used. For the purposes of the present application, a "node index" is an identifier that uniquely describes each node in a network. Examples include a MAC address, IP address, etc.

An exemplary calculation of $\eta_u^t$ is illustrated in method steps below. More specifically, the method steps are configured to calculate $\eta_u^t\{w_e\ \forall_e \in E\}$.

1. Compute shortest path tree for destination t using Dijkstra's method with tie-breaking based on node index
2. Traverse the tree from t to u
3. Initialize $\eta_u^t \leftarrow 1$
4. At every junction, do $\eta_u^t \leftarrow \eta_u^t b$, where b is the number of branches from that junction The overall link-state routing method can be used to control the evolution of the destination specific split ratio $\alpha_{u,v}^t$ for any node u. Suppose that $(u, \bar{v})\in E$ and $(u, \bar{v})$ is part of the shortest path to t from u. Then, certain embodiments of the present invention calculate the split ratios as follows.

$$\text{if } r_u^t > 0,\ \dot{\alpha}_{u,v}^t = -\frac{\alpha_{u,v}^t \delta}{\eta_u^t r_u^t},\ v \ne \bar{v} \tag{6}$$

$$\dot{\alpha}_{u,\bar{v}}^t = -\sum_{u:(u,v)\in E, v\ne\bar{v}} \dot{\alpha}_{u,v}^t \tag{7}$$

$$\text{else if } r_u^t = 0,\ \dot{\alpha}_{u,v}^t = 0,\ v \ne \bar{v} \tag{8}$$

$$\dot{\alpha}_{u,\bar{v}}^t = 1 \tag{9}$$

The equations above specify how to iteratively decide modifying packet forwarding at each router. First, each node checks to see whether it has traffic to a given destination. If it does not already have traffic going to a destination, it forwards all newly received packets to that destination along the shortest path to that destination. If it does already have traffic going to a destination, it adjusts what fraction of traffic it forwards along its different outgoing links according to the equations. As noted in the case studies earlier, it reduces the traffic along non-shortest paths and increases it along the outgoing link leading to the currently calculated shortest path. This procedure is iteratively followed until the optimal solution is obtained.

To prove the optimality of the above link-state hop-by-hop method, two lemmas will be analyzed. The first Lemma relates the node prices to the link weights for each destination t. More specifically, Lemma 1.

$$\sum_{u\in\mathbb{V}} D(u, t)q_u^t = \sum_{(u,v)\in\mathbb{E}} f_{u,v}^t w_{u,v}$$

It analytically states the intuitive idea that the total price of sending traffic to meet the demand in the network, as defined by the sum of the products of the traffic demand rate and the node price for each demand node, is equal to the sum over all links of the price of sending traffic through each link. The second lemma describes how to calculate the time rate of change of network cost.

$$\sum_{(u,v)\in\mathbb{E}} \dot{f}_{u,v}^t w_{u,v} = \sum_{u\in\mathbb{V}} \sum_{(u,v)\in\mathbb{E}} r_u^t \dot{\alpha}_{u,v}^t [w_{u,v} + q_u^t]. \qquad \text{Lemma 2}$$

The second Lemma captures the fact that the change in network cost can either be expressed in terms of the change in the link flow rates, i.e., how each link affects the network cost or in terms of the change in the split ratios at each node, i.e., how each node affects the network cost.

Next, certain method embodiments of the present invention are summarized in the following Theorem.

Theorem. In a network, at every node u, for every destination t, let the evolution of the split ratios be defined by equations (6)-(9). Then, starting from any initial conditions, $\alpha$ converges to the largest invariant set $\{\alpha|\Phi(f)=0\}$ and any element of this set yields an optimal solution to the MCF problem. This result is proved in three steps of the following proof.

Proof. First, it is shown that $\dot{\Phi}(f)\leq 0$. Then, this result invokes LaSalle's Invariance Principle for hybrid systems to assert that $\alpha$ converges to the largest invariant set in $\{\alpha|(f)=0\}$. Third, it is shown that any element of this set is an optimal solution to the MCF problem.

First in this part of the method is step 1, in which the following is true.

$$\Phi(f) = \sum_{t\in\mathbb{V}} \sum_{(u,v)\in\mathbb{E}} f_{u,v}^t w_{u,v} = \sum_{t\in\mathbb{V}} \Phi^t(f)$$

where $\dot{\Phi}^t(f)=\Sigma_{(u,v)\in E}\dot{f}_{u,v}{}^t w_{u,v}$ is the rate of change of the network cost as the flows to destination t change. Consequently, if $\dot{\Phi}^t(f)\leq 0$ for each destination t, then $\dot{\Phi}(f)$. From Lemma 2, $$\dot{\Phi}^t(f) = \sum_{(u,v)\in\mathbb{E}} \dot{f}_{u,v}^t w_{u,v} = \sum_{u\in\mathbb{V}} \sum_{(u,v)\in\mathbb{E}} r_u^t \dot{\alpha}_{u,v}^t [w_{u,v} + q_v^t]$$

This part of the step 1 method is configured to decompose the change in cost to a particular destination t, by grouping the terms from the summation derived in Lemma 2, using the branches of the shortest path tree rooted at that destination. More precisely, a branch (B) is defined as the set of nodes on the path from a leaf node on the shortest path tree to the destination node t. Given the definition, some intermediate nodes clearly will be shared among multiple branches. The change in cost contributed by these nodes is properly divided among the different branches that pass through these routers in the following way. Each node u has a corresponding $\eta_u{}^t$ value which appears in the denominator of the expression for the change in cost. When grouping terms, for a particular branch passing through an intermediate node, to only take a fraction, $1/\pi_u{}^B$, of the change in cost contributed by the intermediate node, to be summed with that branch so that $\pi_u{}^B\eta_u{}^t$, for that node u is the same as the branch cardinality of the leaf router which defines the branch. Consequently, $\pi_u{}^B\eta_u{}^t$ will be the same for all routers u encountered in a traversal from the leaf router of the branch to the destination. Given the definition of $\eta_u{}^t$ and $\pi_u{}^B$, one can check $\Sigma_B 1/\pi_u{}^B=1$, so the total contributing form node u is distributed over different branches. See the following equation.

$$\sum_{u\in\mathbb{V}} \sum_{(u,v)\in\mathbb{E}} r_u^t \dot{\alpha}_{u,v}^t [w_{u,v} + q_v^t] = \sum_{\forall\mathcal{B}} \sum_{u\in\mathcal{B}} \frac{1}{\pi_u^{\mathcal{B}}} \sum_{(u,v)\in\mathbb{E}} r_u^t \dot{\alpha}_{u,v}^t [w_{u,v} + q_u^t]$$

For a given branch B, with n nodes numbered 1, . . . , n from the leaf node to the destination, as noted above, $1/\pi_u{}^B$ is the fraction of the change in cost due to node u that it contributes to the branch summation. For ease of notation, in what follows, the character $\eta$ will be used to represent every router u that belongs to the branch B. For any $u\in\{1, 2, \ldots, n-1\}$, the following equation applies:

$$\frac{1}{\pi_u^{\mathcal{B}}} \sum_{(u,v)\in\mathbb{E}} r_u^t \dot{\alpha}_{u,v}^t [w_{u,v} + q_u^t] = -\frac{\delta}{\eta}(q_u^t - w_{u,u+1} - q_{u+1}^t) \qquad (10)$$

If $r_u{}^t=0$, following equations (8) and (9), the left hand side of (10) is zero because $\dot{\alpha}_{u,v}{}^t=0$, the right hand side of (10) is also zero because $\alpha_{u,u+1}{}^t=1$. If $r_u{}^t>0$, (10) is still valid because of the following.

$$\begin{aligned}\frac{1}{\pi_u^{\mathcal{B}}} \sum_{(u,v)\in\mathbb{E}} r_u^t \dot{\alpha}_{u,v}^t [w_{u,v} + q_u^t] &= -\frac{\delta}{\eta}\left(\sum_{(u,v)\in\mathbb{E}} \alpha_{u,v}^t [w_{u,v} + q_u^t] - \sum_{(u,v)\in\mathbb{E}} \alpha_{u,v}^t [w_{u,u+1} + q_{u+1}^t]\right) \\ &= -\frac{\delta}{\eta}(q_u^t - w_{u,u+1} - q_{u+1}^t)\end{aligned}$$

Therefore $$\begin{aligned}\sum_{u\in\mathcal{B}} \frac{1}{\pi_u^{\mathcal{B}}} \sum_{(u,v)\in\mathbb{E}} r_u^t \dot{\alpha}_{u,v}^t [w_{u,v} + q_u^t] &= \sum_{u=1}^{n-1} -\frac{\delta}{\eta}(q_u^t - w_{u,u+1} - q_{u+1}^t) \\ &= -\frac{\delta}{\eta}[q_1^t - w_{1,2} - \ldots - w_{n-1,n}] \leq 0\end{aligned}$$

The last inequality follows from the fact that the average price from the leaf router (node 1) to the destination (node n) which can be thought of as an average over paths from Equation (2), has to be no less than the price of the shortest path. Note that this relationship holds with equality only when the node price of the leaf node is the same as the price of the shortest path which means that all the traffic from every node in the branch to the destination is along shortest paths to the destination.

Then, the result is as follows.

$$\Phi = \sum_t \Phi^t(f) = \sum_{(u,v)\in\mathbb{E}} f^t_{u,v}\Phi'(f_{u,v}) \le 0 \tag{11}$$

The next step is related to convergence. Given the control laws, it is clear that $\dot{\Phi}(f)\le 0$. In order to show convergence, the language of hybrid automata is used to model the dynamics of this system and methods. Specifically, embodiments of this invention are an example of a non-blocking, deterministic, and continuous hybrid automaton. Consequently, invoking a generalization of LaSalle's Invariance Principle to hybrid automata ensures that the set of split ratios converges to the largest invariant set within $\{\alpha|\dot{\Phi}(f)=0\}$.

The subsequent step is related to optimality. For $\dot{\Phi}(f)=0$ to be true, $\dot{\Phi}(f)=0$ which implies that the change in cost along each branch is as follows.

$$\sum_{u\in\mathcal{B}} \frac{1}{\pi^{\mathcal{B}}_u} \sum_{\substack{(u,v)\in\mathbb{E} \\ \text{such that } u\in\mathcal{B}}} r^t_u \dot{\alpha}^t_{u,v}[w_{u,v}+q^t_v] = 0$$

for every t.

From the preceding analysis, the change in cost along a branch B is zero only when all the traffic from the nodes that belong to the branch is being routed to the destination through shortest paths with respect to the link prices. Since this is a necessary and sufficient condition for optimality in MCF, the proof is complete.

Figure 4:
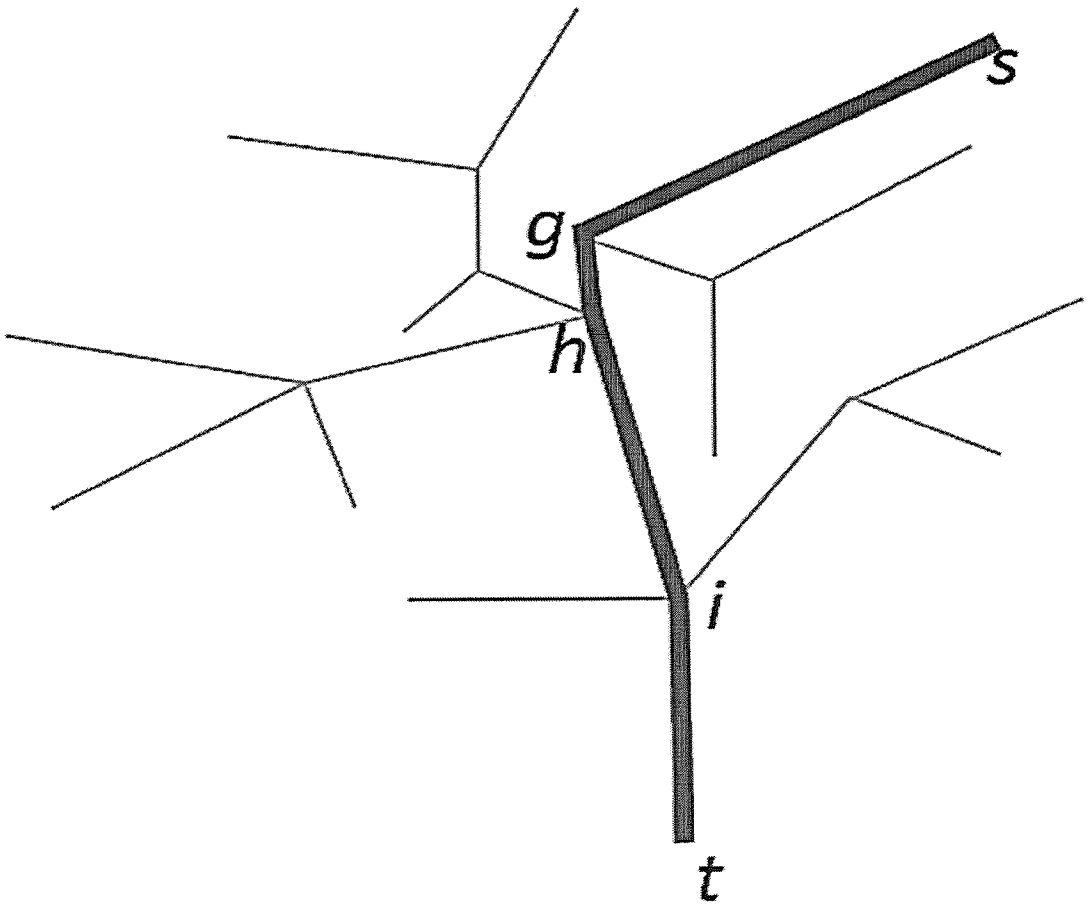
FIG. 4 illustrates a shortest path tree in a network along with a branch of that tree highlighted.

Next, as an illustrative example to help understand the first step of the above proof, a sample shortest path tree is analyzed and the corresponding cost change calculations are identified explicitly. A shortest path tree is illustrated in FIG. 4. The number of branches that the tree is divided into is determined by the number of leaf nodes. In the illustrated example, the shortest path tree rooted at t has 12 leaf routers and, consequently, the summation is divided into 12 branches. Following the method for the calculation of $\eta$, $\eta_i^t=1$, $\eta_h^t=3$, $\eta_g^t=9$ and $\eta_s^t=18$.

As noted in the proof, the change in the cost function due to the routers increasing traffic along the links in the shortest path tree can be calculated using Lemma 2. In order to evaluate it, the terms in the summation are divided and grouped per branch. For routers downstream to a leaf router in a branch, only a fraction of the change in the cost contributed by the downstream router is selected where the fraction is determined by the need to have the same $\eta$ for all routers in the summation for a branch. The contribution to the change in the cost by the routers for the highlighted branch can be calculated as follows, $$\sum_{u\in\mathcal{B}} \frac{1}{\pi^{\mathcal{B}}_u} \sum_{(u,v)\in\mathbb{E}} r^t_u \dot{\alpha}^t_{u,v}[w_{u,v}+q^t_u] =$$

$$-r^t_s \sum_{(s,v)\in\mathbb{E}} \frac{\alpha^t_{s,v}\delta}{\eta^t_s r^t_s}[w_{s,v}+q^t_u] + r^t_s \sum_{(s,v)\in\mathbb{E}} \frac{\alpha^t_{s,v}\delta}{\eta^t_s r^t_s}[w_{s,g}+q^t_g] -$$

$$r^t_g \sum_{(g,v)\in\mathbb{E}} \frac{\alpha^t_{g,v}\delta}{2\eta^t_g r^t_g}[w_{g,v}+q^t_v] + r^t_g \sum_{(g,v)\in\mathbb{E}} \frac{\alpha^t_{g,v}\delta}{2\eta^t_g r^t_g}[w_{g,h}+q^t_h] -$$

-continued $$r^t_h \sum_{(h,v)\in\mathbb{E}} \frac{\alpha^t_{h,v}\delta}{6\eta^t_h r^t_h}[w_{h,v}+q^t_v] + r^t_h \sum_{(h,v)\in\mathbb{E}} \frac{\alpha^t_{h,v}\delta}{6\eta^t_h r^t_h}[w_{h,i}+q^t_i] -$$

$$r^t_i \sum_{(i,v)\in\mathbb{E}} \frac{\alpha^t_{i,v}\delta}{18\eta^t_i r^t_i}[w_{i,v}+q^t_v] + r^t_i \sum_{(i,v)\in\mathbb{E}} \frac{\alpha^t_{i,v}\delta}{18\eta^t_h r^t_i}[w_{i,t}] =$$

$$-\frac{\delta}{\eta^t_s}[q^t_s - w_{s,g} - w_{g,h} - w_{h,i} - w_{i,t}] \le 0$$

Figure 5A:
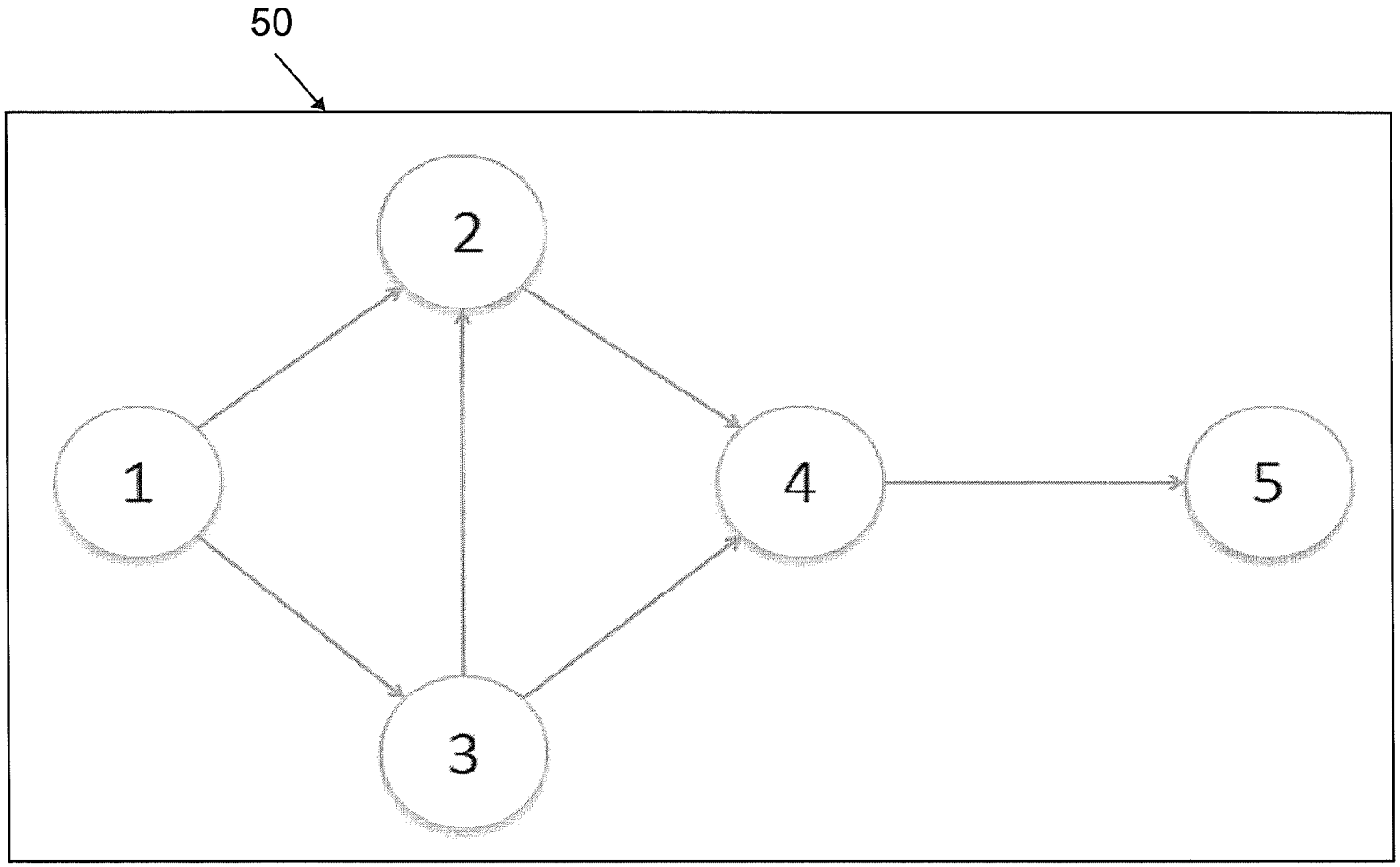
FIG. 5A illustrates an example of a network according to the present invention.
Figure 5B:
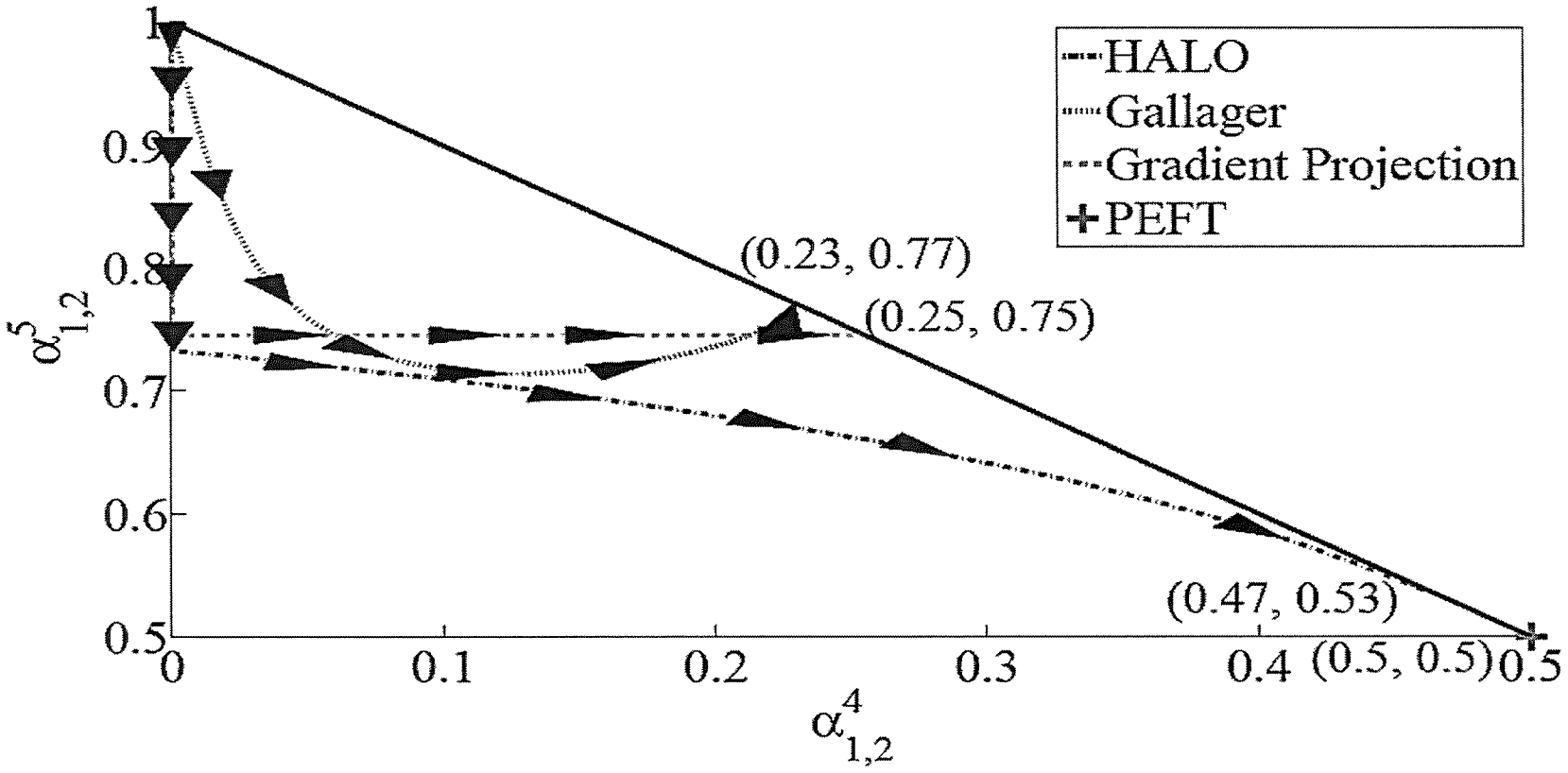
FIG. 5B illustrates a comparison of solutions provided by different procedures seeking to identify the optimal solution to a network routing problem.

As shown in FIG. 3, the present invention may follow a different trajectory from Gallager's method in searching for an optimal solution. But in that case, both methods converged to the same optimal solution. In general, because MCF problem is strictly convex in link rates ($f_{u,v}$) and only convex in flow rates ($f_{u,v}^{\tilde{t}}$), there can be multiple optimal solutions in terms of the flow rates. For example, FIG. 5A illustrates an example of a network topology. Each link in the network has capacity of 5 and there are two demands D(1, 4)=D(1, 5)=2. The initial routes supplied to the different methods are (1-3-2-4) and (1-2-4-5), i.e., $\alpha_{1,2}^4=0$ and $\alpha_{1,2}^5=1$. FIG. 5B includes a graph of solutions provided by an embodiment of the present invention—designated as "HALO". Clearly, each method generates a different optimal solution, all of which satisfy $\alpha_{1,2}^4+\alpha_{1,2}^5=1$; an optimality condition which follows from the fact that at optimum, $f_{3,2}=0$ and the resulting symmetry of the problem.

Before reviewing how embodiments of the present invention may interact with a single-path routing method, certain terms are defined. First, for the purposes of this application, a "single-path method used to make routing decisions" is a router that uses a set of link weights to calculate the shortest path to the destination and makes forwarding decisions based on that shortest path. Also, if the single-path router calculations are triggered as often as that in the present invention, examples can be illustrated in which the routes in the network will oscillate and not settle down. This is because the single-path method moves all the traffic from one path to another instead of just a fraction. Also, a notion of time-scale separation between how often the method of the present invention is triggered and the single-path method is triggered. In certain embodiments, the subset of routers running the present invention will execute the method in between slower single-path calculations. Given this set up, the two methods can work with either the same link weights or method-specific link weights. Since local optimization methods exist for calculating single-path method link weights and because method-specific calculations can be triggered on the receipt of new method-specific link weights, the use of method-specific link weights generally are broadcast by each router at different timescales. However, this assumption is more important from an implementation perspective than for the argument that follows.

Another useful assumption is that each router is aware of the method that the other routers in the network are using. With the time-scale separation and the assumption that every router is aware of the specific method running at every other router, for a given destination, the 'single-path' routers have a pruning effect on the network from the perspective of the routers running an embodiment of the present invention, i.e., the outgoing links that are not used by them are effectively not a part of the network topology. Assuming that every router is aware of the specific method running at every other router, the nodes running embodiments of the present invention will base their calculations on this reduced network and attain the optimal routing solution for this network. Essentially, the routers implementing an embodiment of the present invention increase the search space for finding a better routing solution and thus improve network performance.

Figure 6:
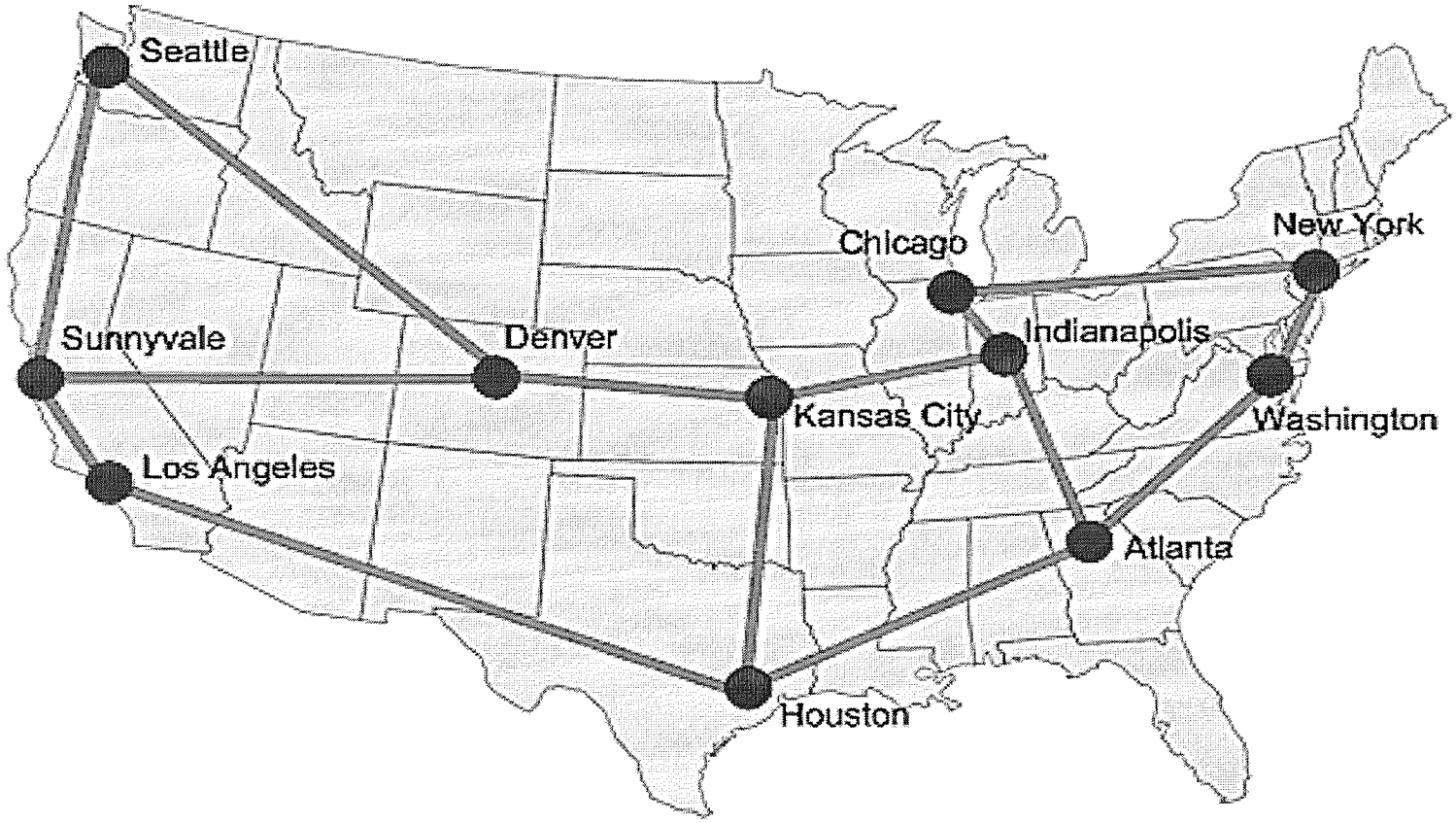
FIG. 6 illustrates an Abilene network.

Certain embodiments of the present invention can be evaluated for certain performance metrics, specifically, the optimality, rate of convergence to the optimal solution, adaptivity as the traffic changes, and asynchronous environments and its interaction with single path routing methods. The evaluations may be performed on three network topologies—the benchmark Abilene network (FIG. 6), a 4×4 Mesh network and a two-level hierarchical 50 node network. The 4×4 Mesh network may be selected to study the effects of intermediate routing loops on the optimality of the present invention as this topology is particularly prone to such loops while the hierarchical network may be selected to mimic larger networks with high capacity backbone links and lower capacity local links. An additional test may be performed on an even larger randomly generated 100 node network in order to confirm that the method converges quickly for large networks. Randomly generated traffic demands may be used for the mesh network and the hierarchical network while for the Abilene network uniform traffic demand is used. In any of the three cases, the demand may be scaled up until at least one link in the network is close to saturation at the optimal solution.

Regarding convergence, the speed of convergence depends on the step-size. In certain embodiments, the step size is the unit of time with which the changes in the split ratios calculated in Equations (6)-(9) is multiplied to determine how much to vary the split ratios from one time slot to the next. The metric, network load is defined as the ratio of the total traffic on the network to its total capacity. In general, smaller step-sizes improve convergence of an embodiment of the present invention to the optimal solution at the expense of speed of convergence.

Figure 8A:
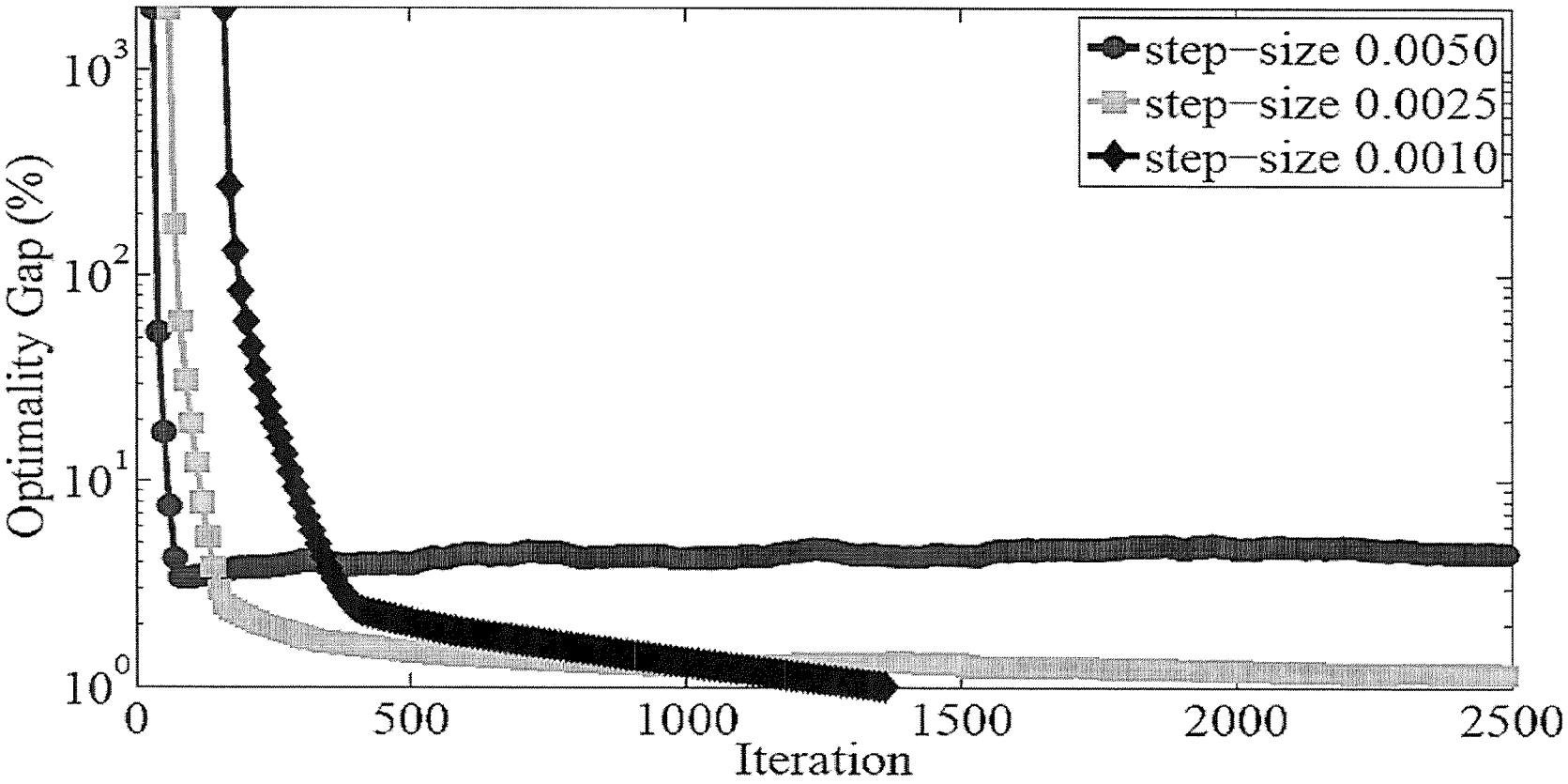
FIG. 8A illustrates a comparison of the optimality gap between an embodiment of the present invention over a number of iterations having different step-sizes in the Abilene network.
Figure 8B:
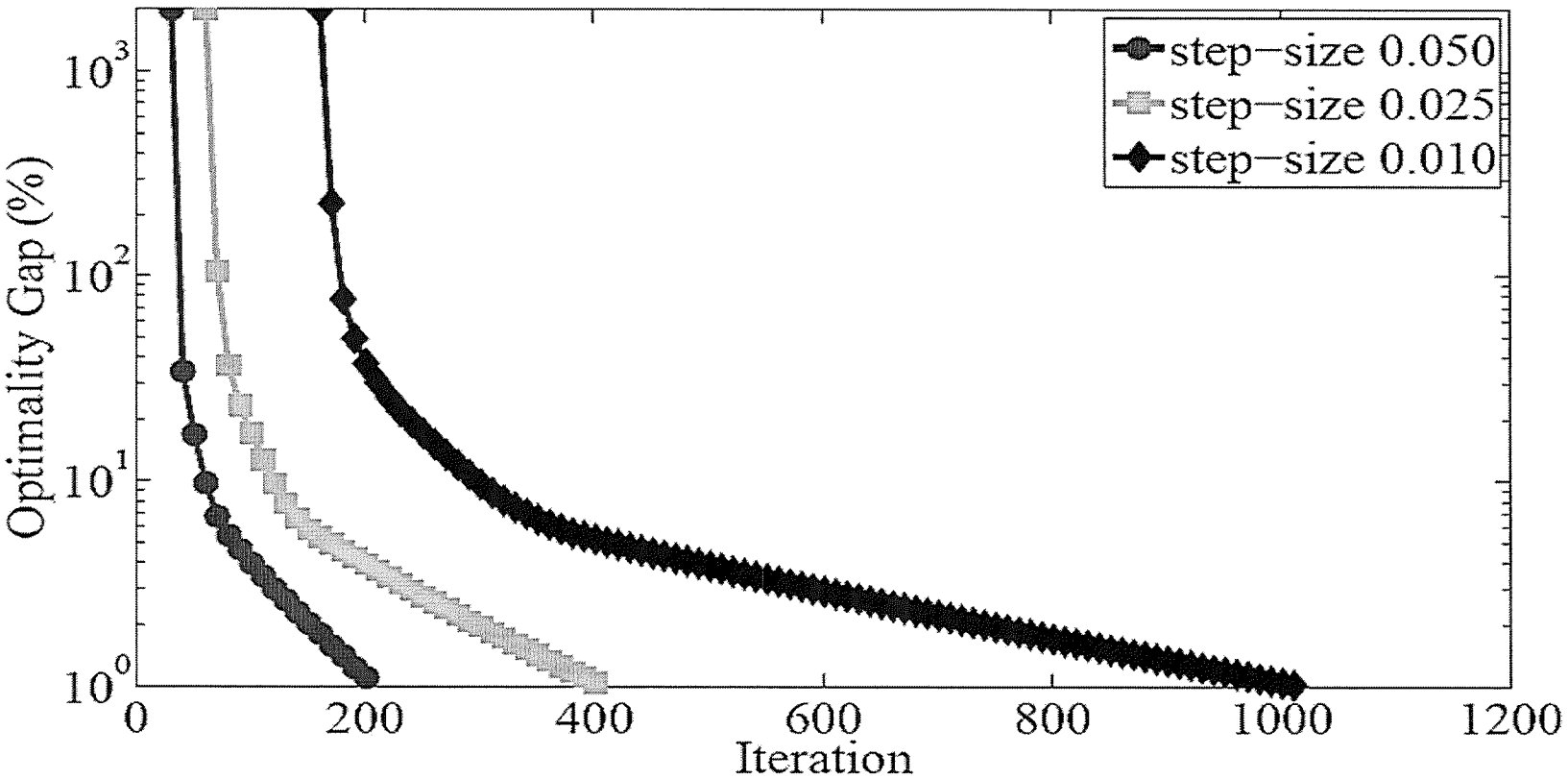
FIG. 8B illustrates a comparison of the optimality gap between an embodiment of the present invention over a number of iterations having different step-sizes in a 4×4 mesh network.
Figure 8C:
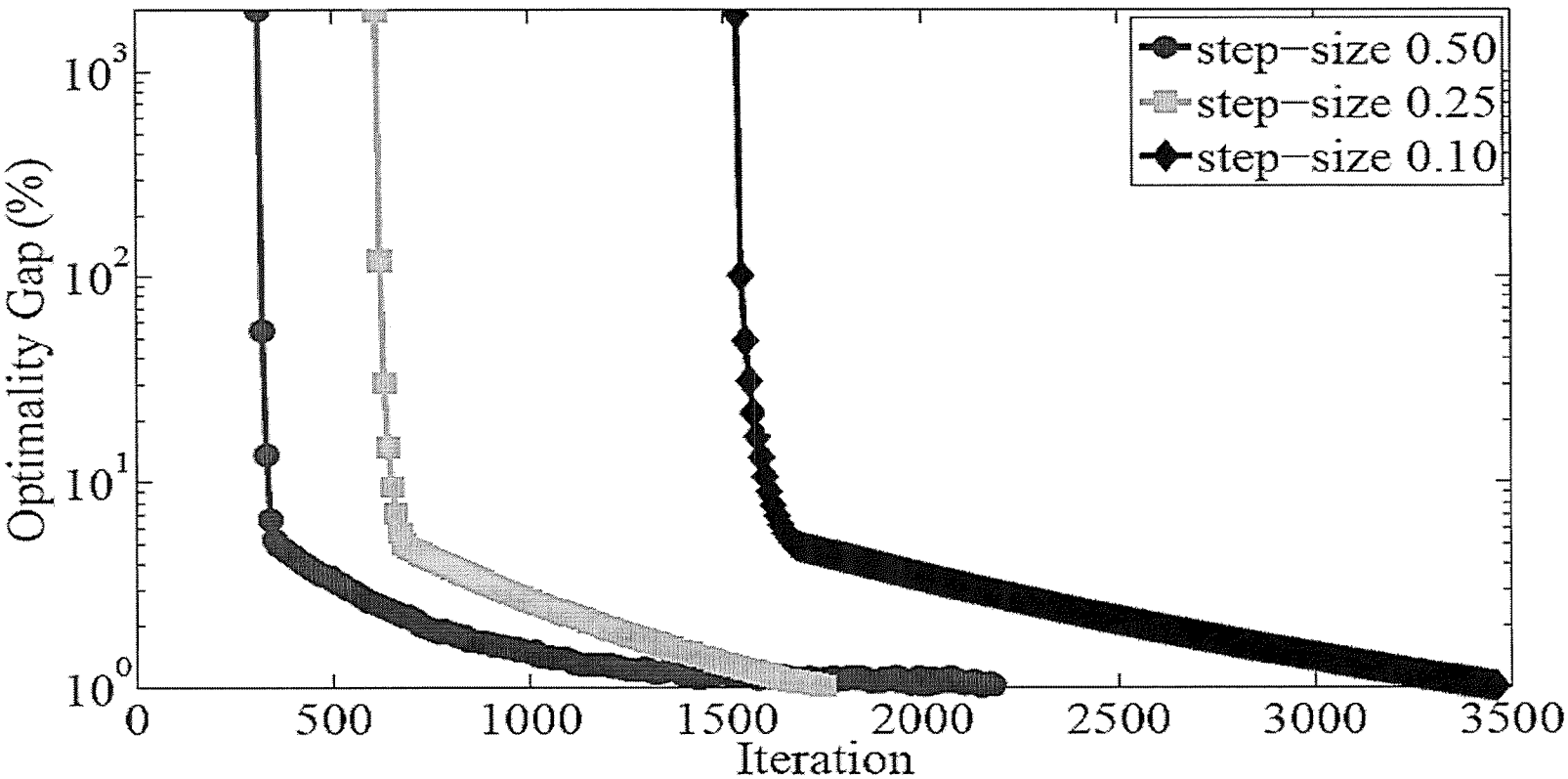
FIG. 8C illustrates a comparison of the optimality gap between an embodiment of the present invention over a number of iterations having different step-sizes in a hierarchical 50 node network.
Figure 12:
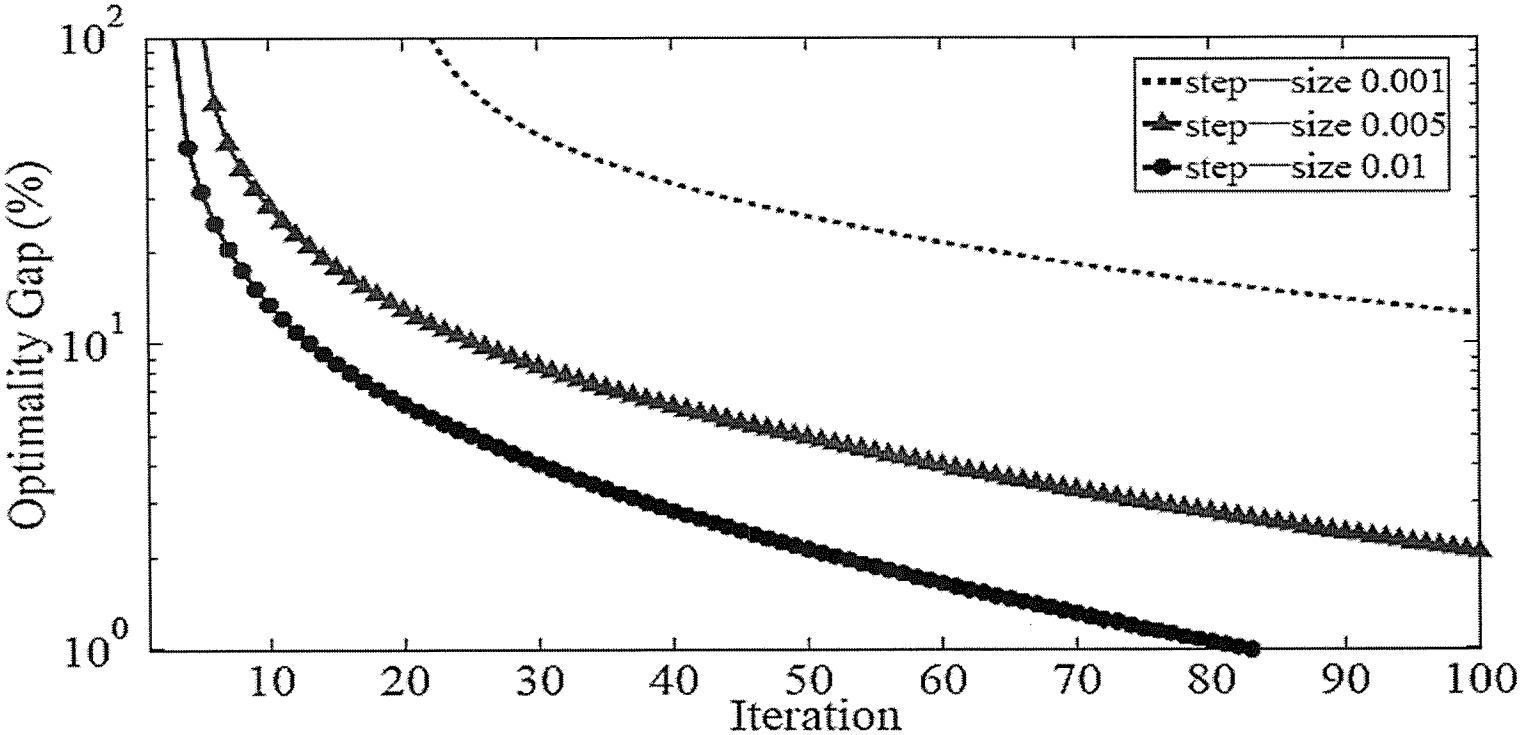
FIG. 12 illustrates evolution of the optimality gap for a randomly generated 100 node network with varying step-sizes.

This concept is illustrated in FIG. 8A-FIG. 8C. However, as illustrated in FIG. 8A and FIG. 8C, larger step-sizes quickly approach the optimal solution though they can be prone to oscillations which prevent convergence to optimality. Often, it is sufficient to come to some neighborhood of the optimal solution and small oscillations around the optimal solution are acceptable. In such situations, a larger step-size may be used. In certain embodiments, e.g., for the larger 100 node network (illustrated in FIG. 12) the system and method was fairly quick, converging to a small neighborhood of the optimal solution within a few hundred iterations.

Figure 7A:
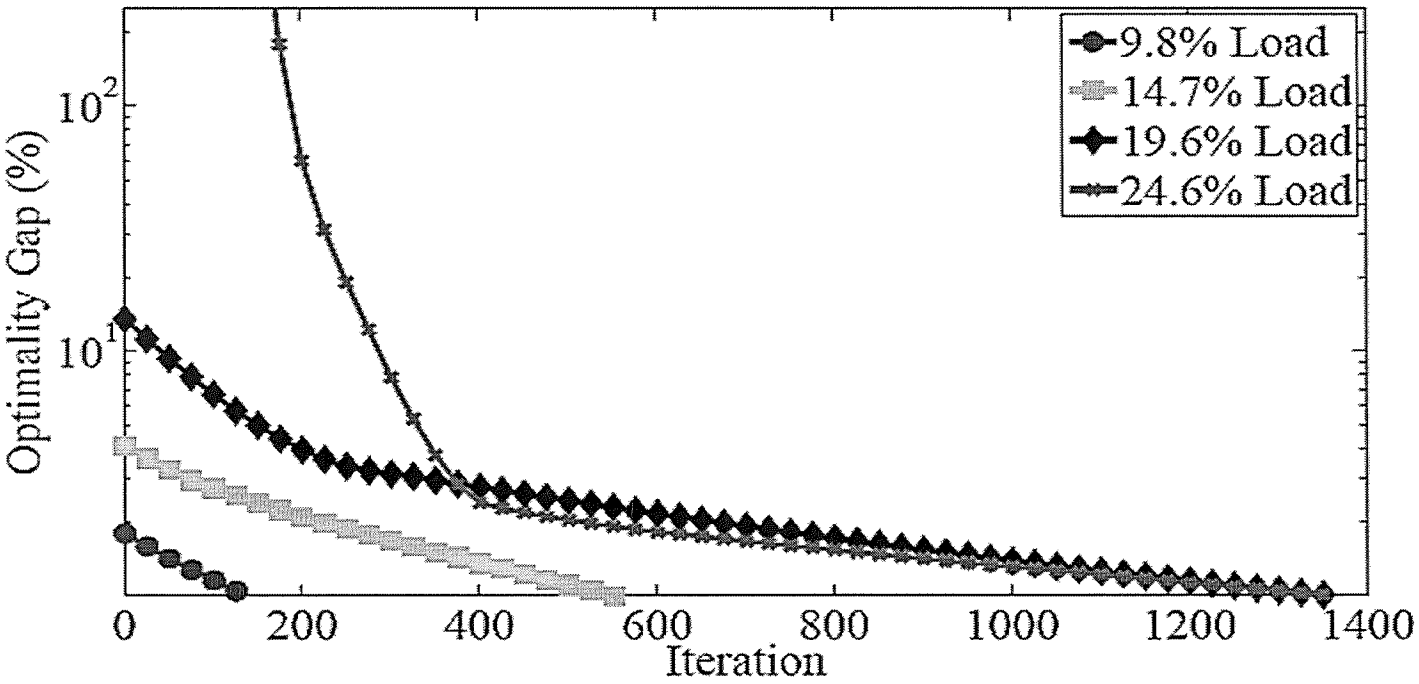
FIG. 7A illustrates a comparison of the optimality gap between an embodiment of the present invention over a number of iterations having different network loads in the Abilene network.
Figure 7B:
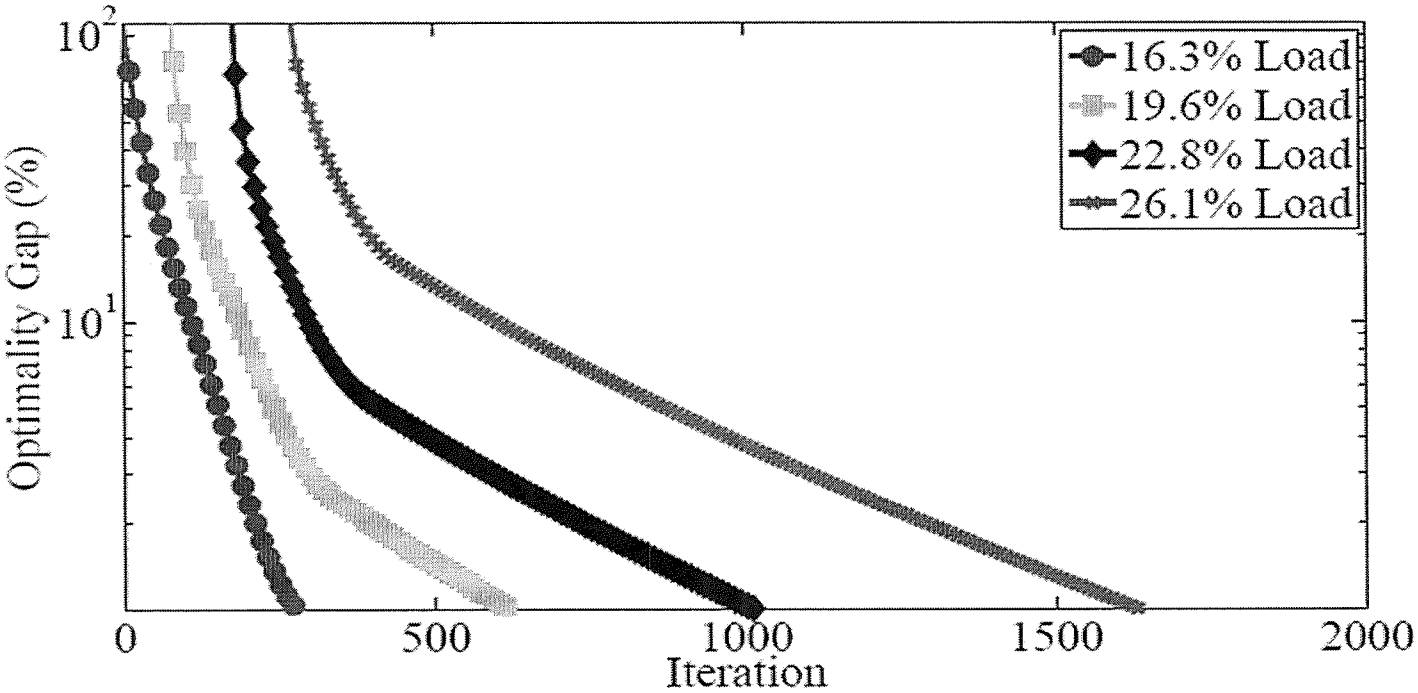
FIG. 7B illustrates a comparison of the optimality gap between an embodiment of the present invention over a number of iterations having different network loads in a 4×4 mesh network.
Figure 7C:
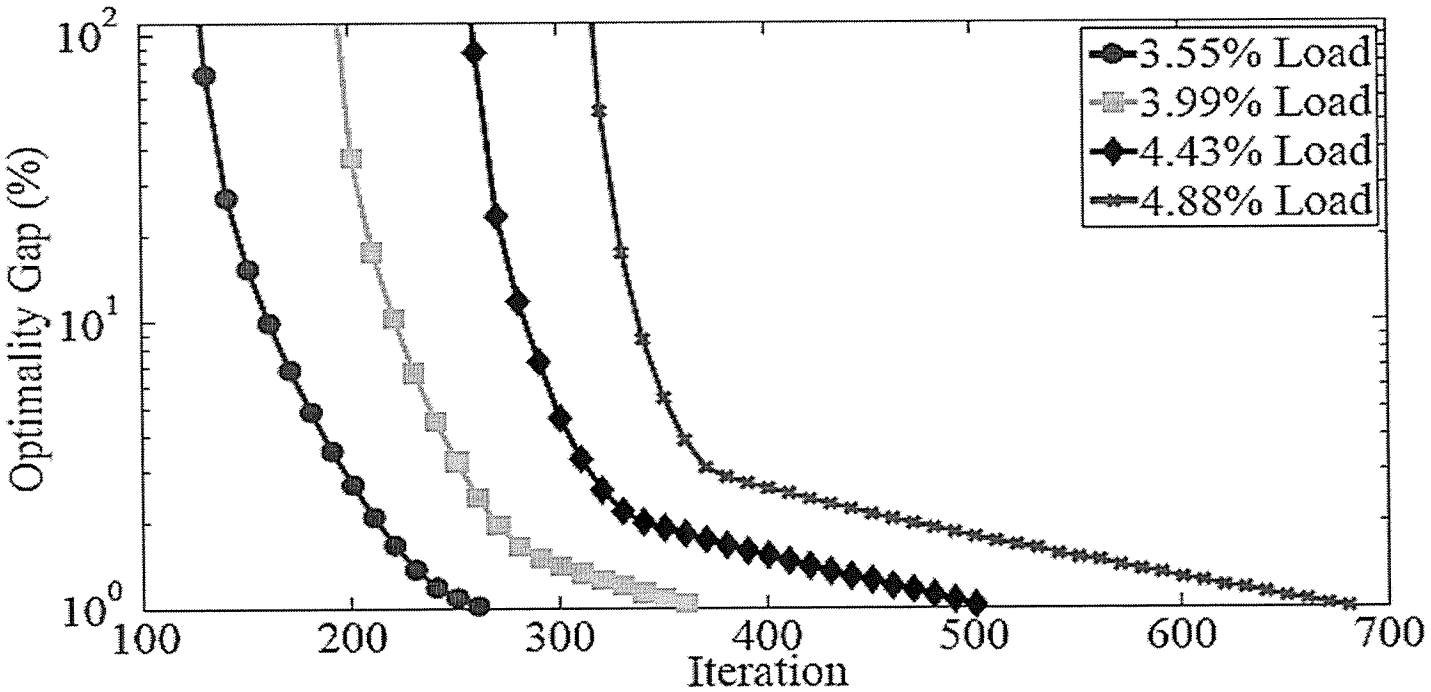
FIG. 7C illustrates a comparison of the optimality gap between an embodiment of the present invention over a number of iterations having different network loads in a hierarchical 50 node network.

Another factor that affects the rate of convergence of the system and methods is the load on the network. The maximum network load for the Abilene network may be 24.6%, mesh network may be 26.1% and the hierarchical network may be 5.3%. These values indicate the point at which further scaling up the demand for the given traffic pattern would exceed the capacity of at least one link in the network, even with optimal routing. From FIG. 7, it is clear that the system and methods take more iterations to converge to the optimal solution for more heavily loaded networks. The present invention converges to the optimal solution on the order of a thousand iterations. Given that link-state advertisements can be broadcast on the order of milliseconds, the possibility of convergence times of less than a second to a few seconds for the method on networks where transmission/propagation delay of the link-state advertisements is not a limiting factor.

Figure 9A:
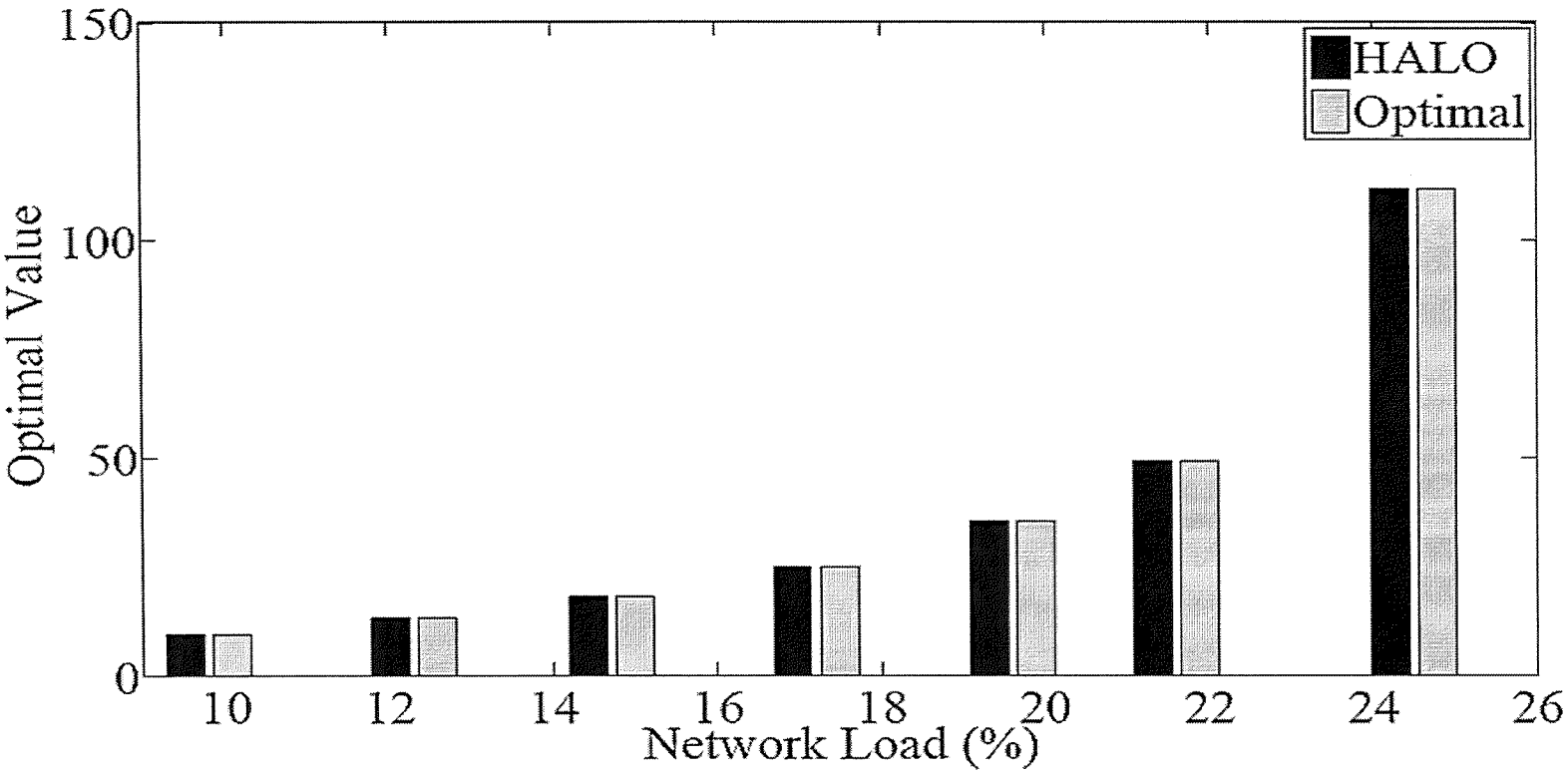
FIG. 9A illustrates a comparison of the optimal performance and an embodiment of the present invention in the Abilene network.
Figure 9B:
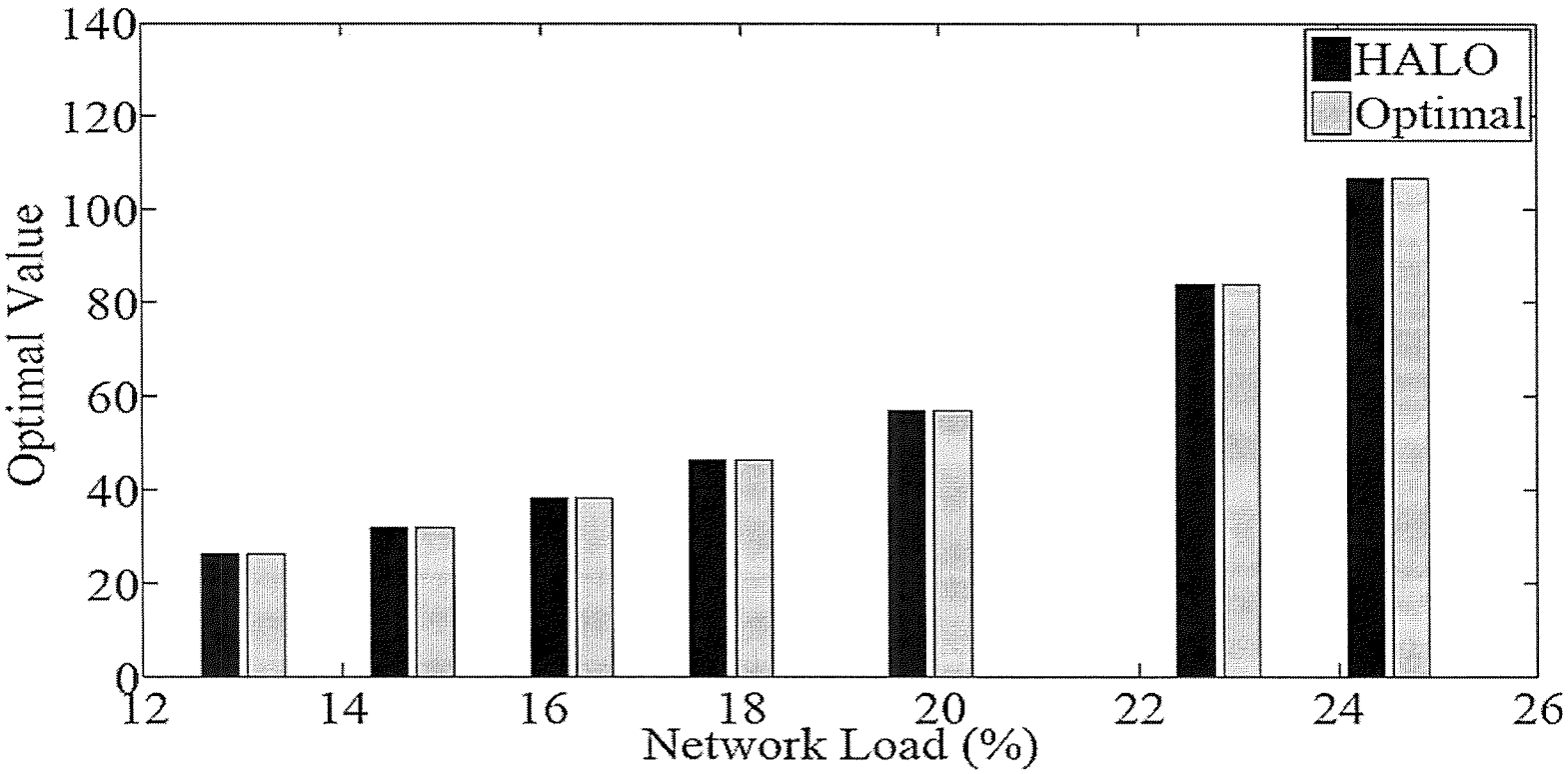
FIG. 9B illustrates a comparison of the optimal performance and an embodiment of the present invention in a 4×4 mesh network.
Figure 9C:
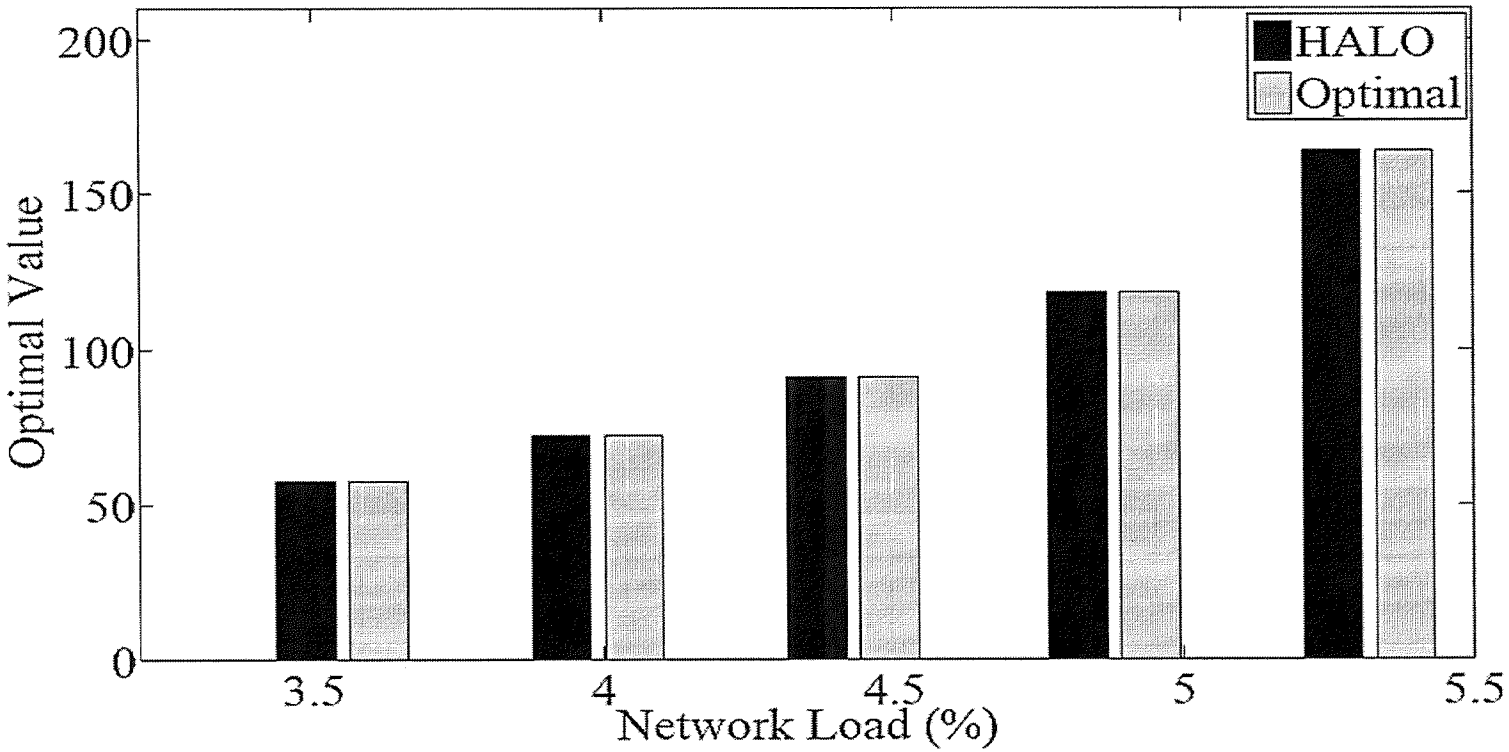
FIG. 9C illustrates a comparison of the optimal performance and an embodiment of the present invention in a hierarchical 50 node network.

Regarding performance, the optimal solution may be calculated for the test networks by solving the corresponding MCF problem using cvx method known in the art or another method known in the art under different network load conditions. The objective value obtained by using the present invention matched the optimal solution for each test case as can be seen from FIG. 9A-FIG. 9C. Also, the intermediate routing loops produced while determining the optimal solution for the mesh network did not affect the optimality of the system and methods.

Figure 10A:
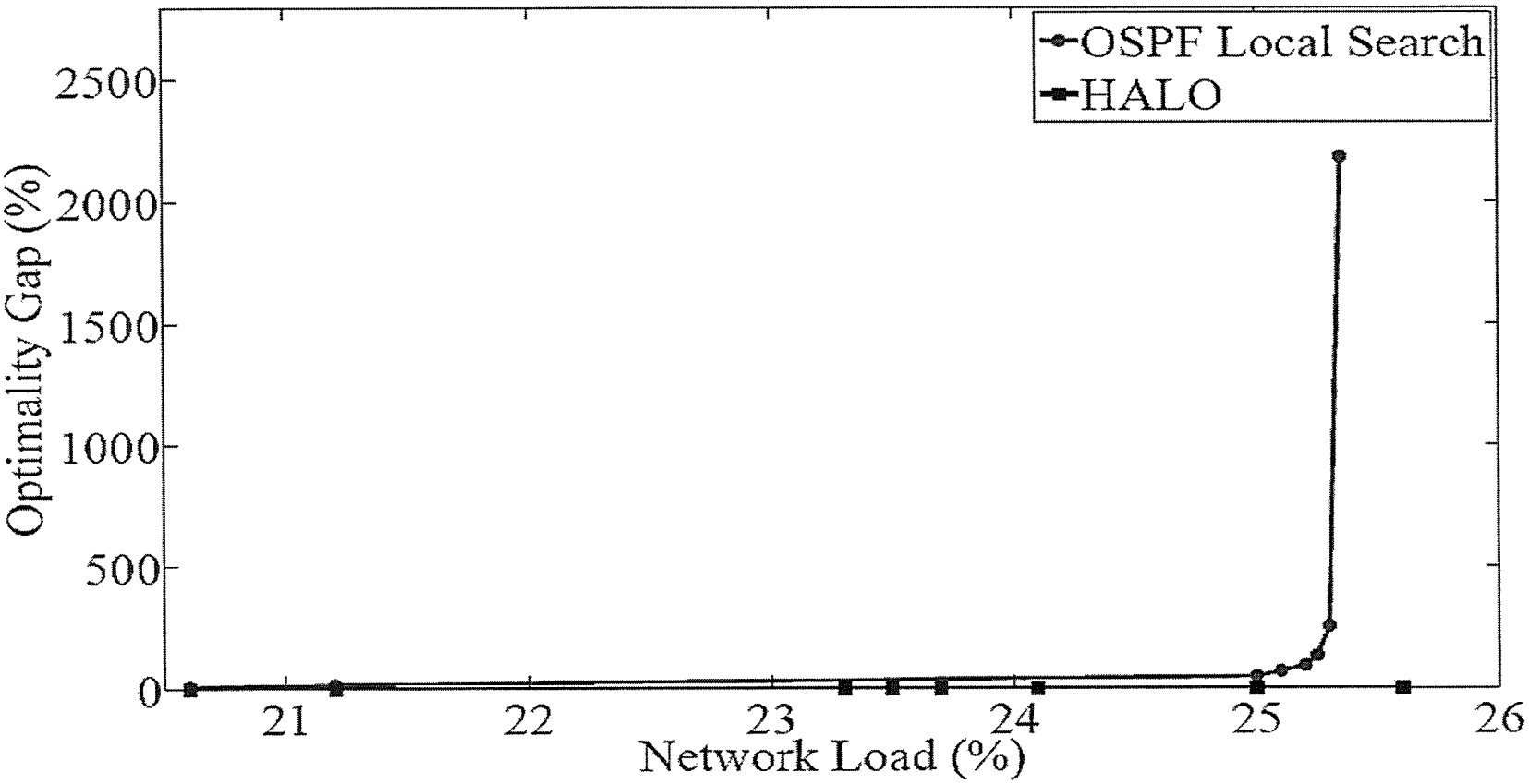
FIG. 10A illustrates a comparison of a known procedure (OSPF with optimized link weights) and an embodiment of the present invention in the Abilene network.
Figure 10B:
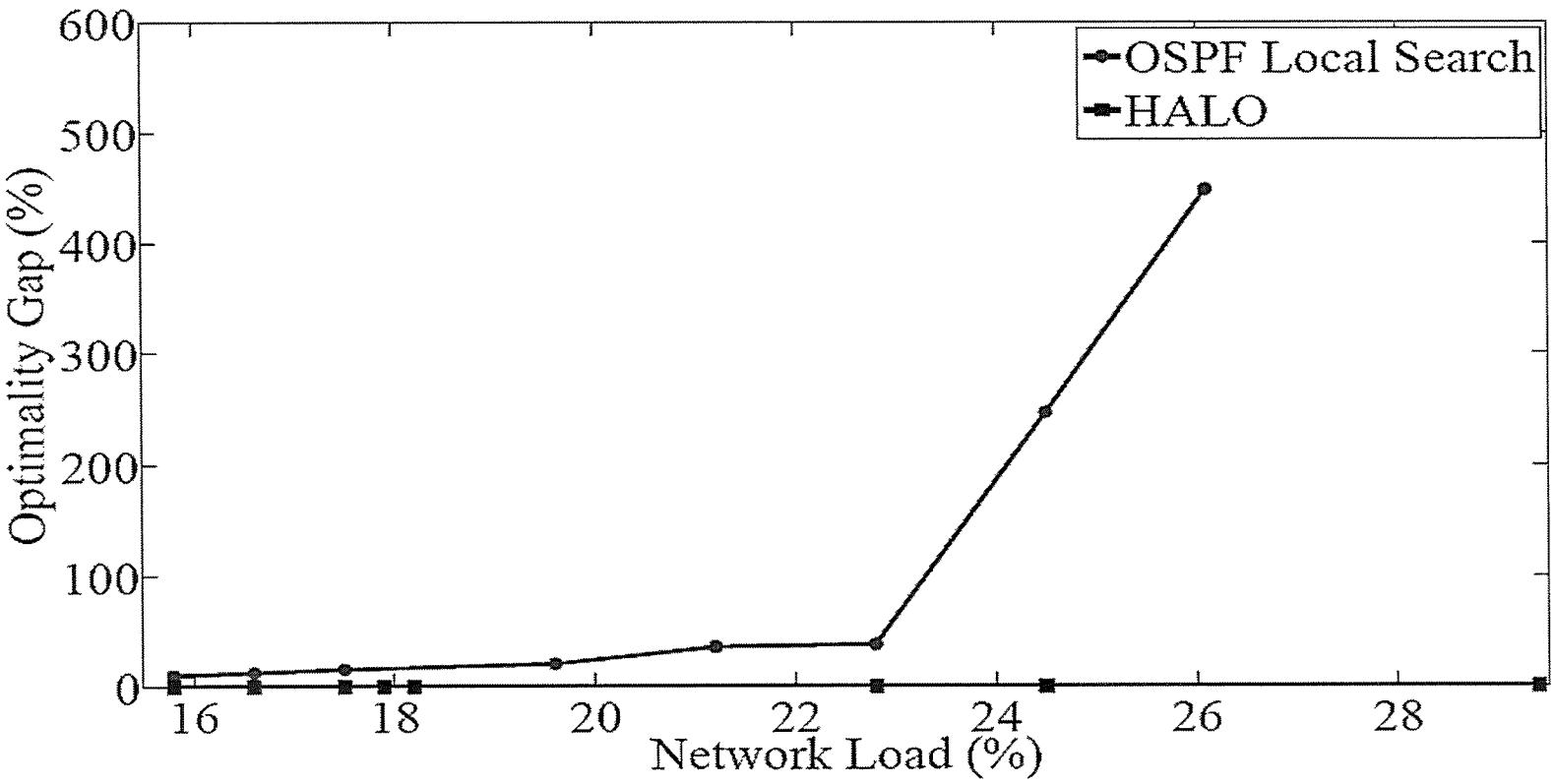
FIG. 10B illustrates a comparison of a known procedure (OSPF with optimized link weights) and an embodiment of the present invention in a 4×4 mesh network.
Figure 10C:
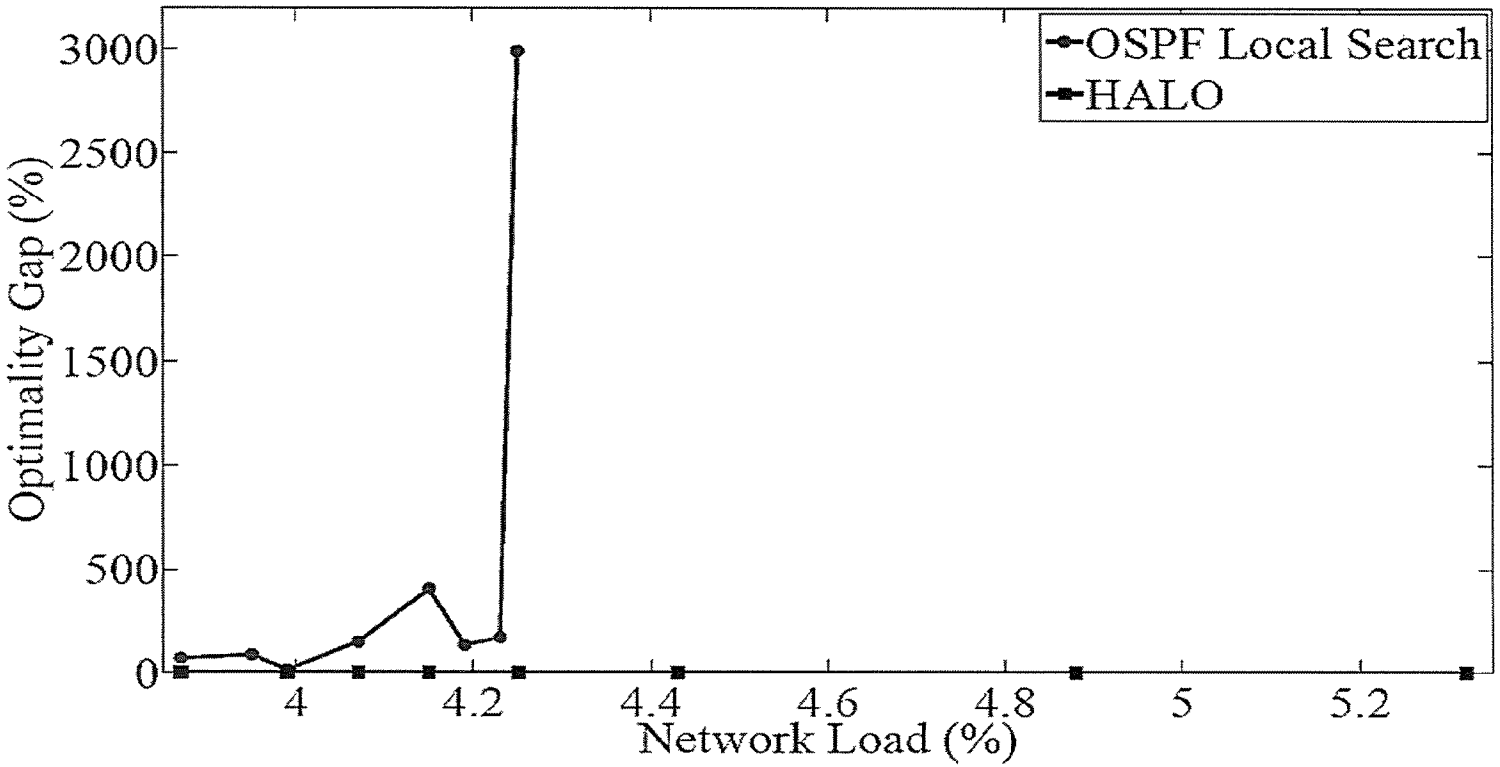
FIG. 10C illustrates a comparison of a known procedure (OSPF with optimized link weights) and an embodiment of the present invention in a hierarchical 50 node network.

In FIG. 10, the performance of an embodiment of the present invention is compared with OSPF boosted by better weight settings obtained from the methods of the TOTEM toolbox for demand matrices that placed increasing loads on the test networks. The local search method used by TOTEM minimizes a piecewise-linear approximation of the convex cost function. As described above, the power of optimality is demonstrated by the performance improvements on the order of 1000%.

Figure 11A:
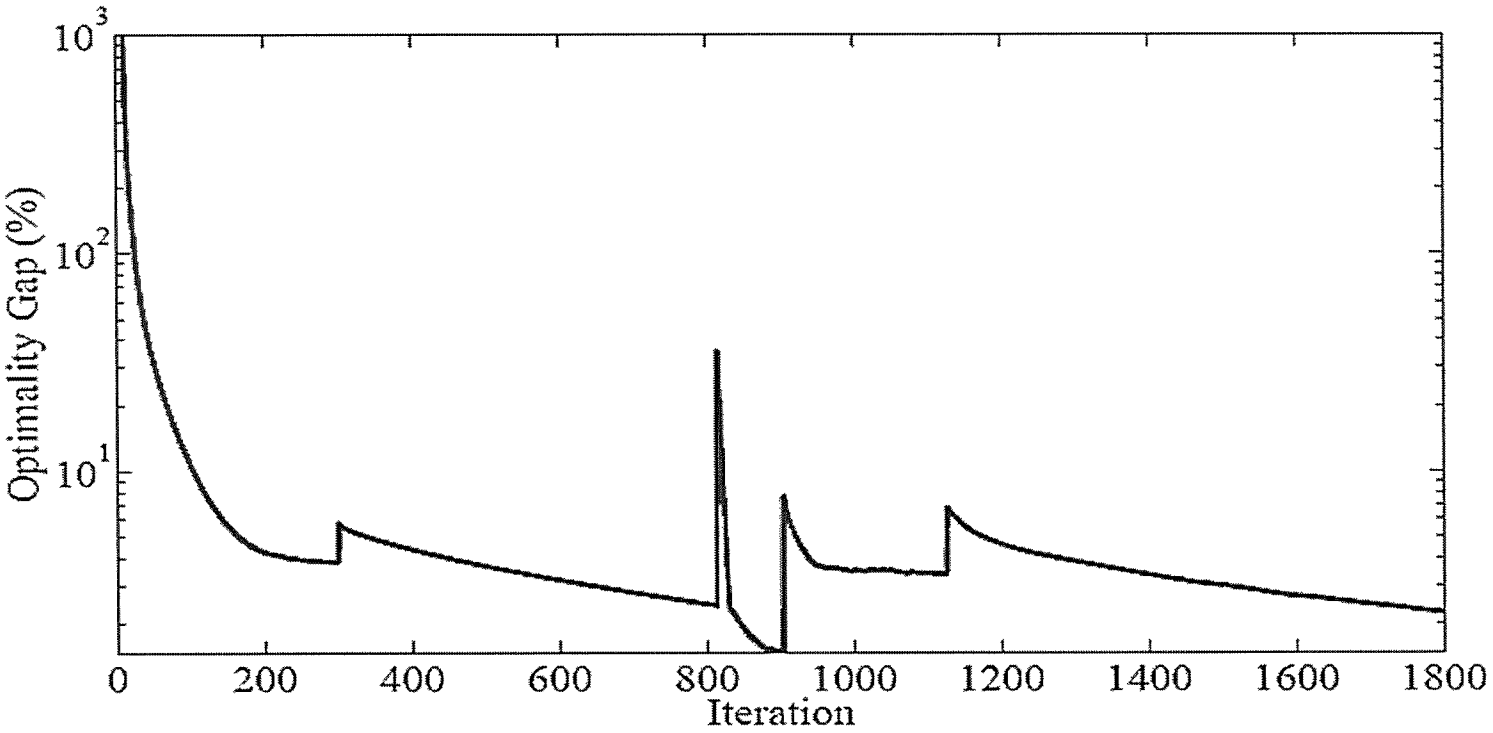
FIG. 11A illustrates the evolution of optimality gap for the Abilene network as the number of iterations increase with varying demand matrices.

To illustrate how certain embodiments of the present invention are configured to dynamically adapt to changes in traffic on the network, FIG. 11 illustrates the evolution of the optimality gap as a traffic matrix undergoes changes under different network load conditions in the Abilene network. In this example, after around 300 iterations the network load is changed by changing 20% of the flows in the network. As can be seen, the method quickly adapts and the optimality gap increases very little before beginning to converge to the new optimal solution. The traffic pattern is again changed by varying 50% of the flows in the network after 800 iterations. This time the change in the optimality gap is greater but the convergence to the new optimal value is seen to be quicker. The traffic pattern in the network is changed two more times and as can be observed from the figure in both cases the method quickly converges to the new optimal solution.

Figure 11B:
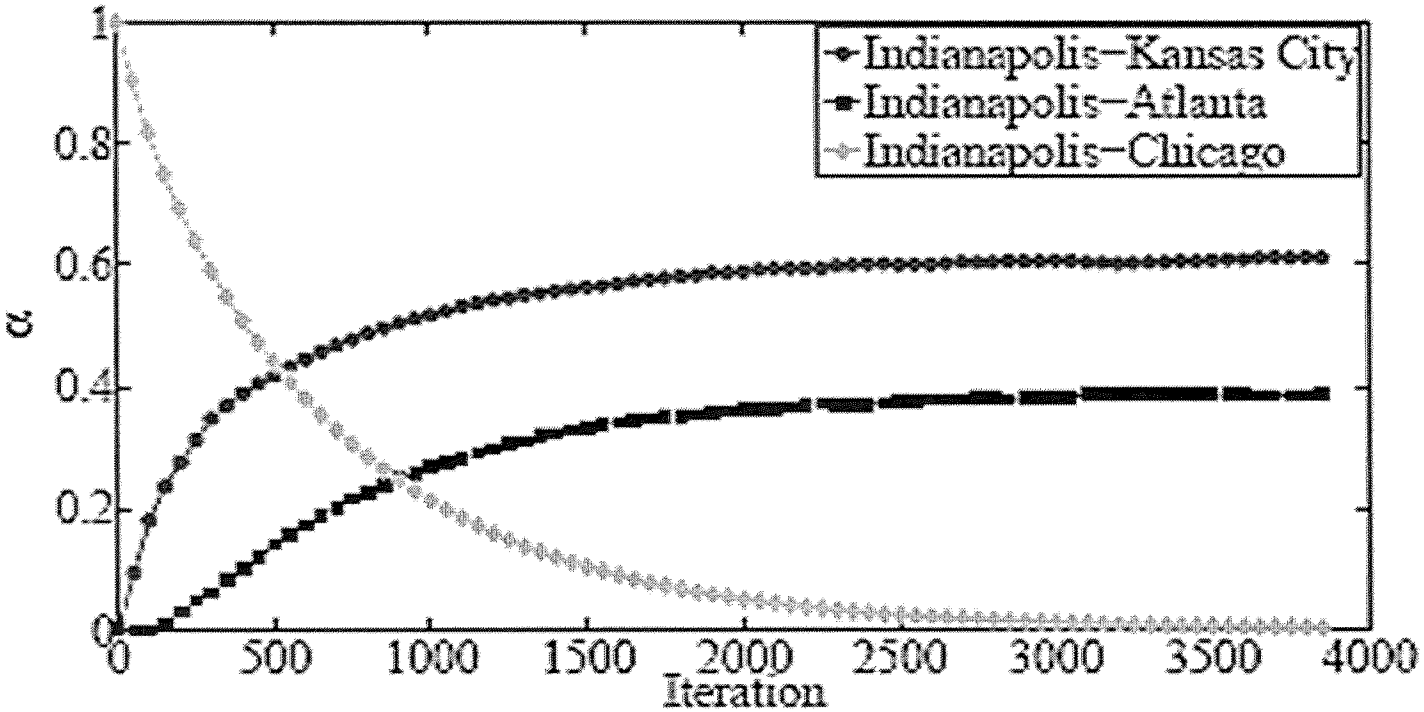
FIG. 11B illustrates evolution of split ratios to Chicago, Kansas City and Atlanta for traffic destined to LA at the Indianapolis node in Abilene network.

A closely related concept to certain embodiments of the system and methods of the present invention is the evolution of the split ratios at individual routers. A plot of the evolution of the split ratios from Indianapolis to Los Angeles is illustrated in FIG. 11B. For the test traffic, the initial sub-optimal allocation of split ratios is quickly corrected as the present invention reduces traffic sent to Chicago and increases traffic sent to Kansas City and Atlanta.

Figure 13A:
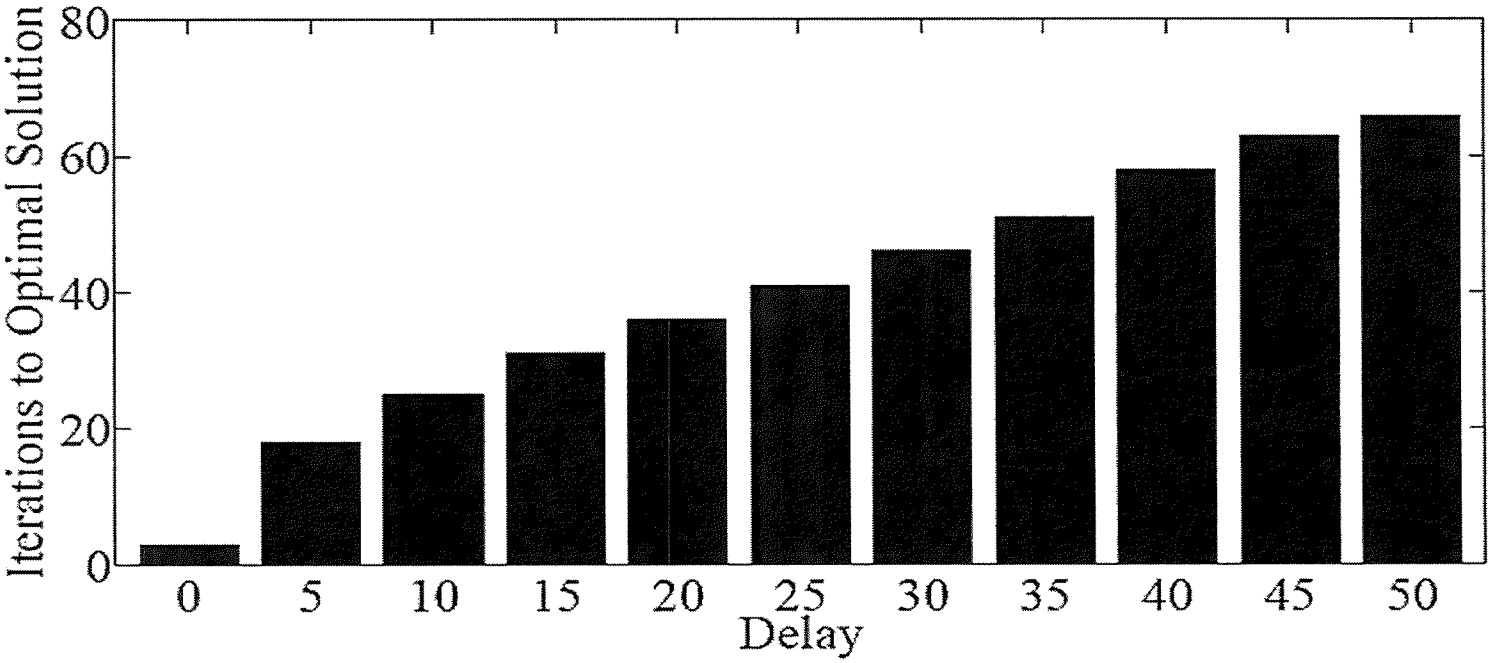
FIG. 13A illustrates iterations required to converge increase with increasing delay at step-size=0.1.
Figure 13B:
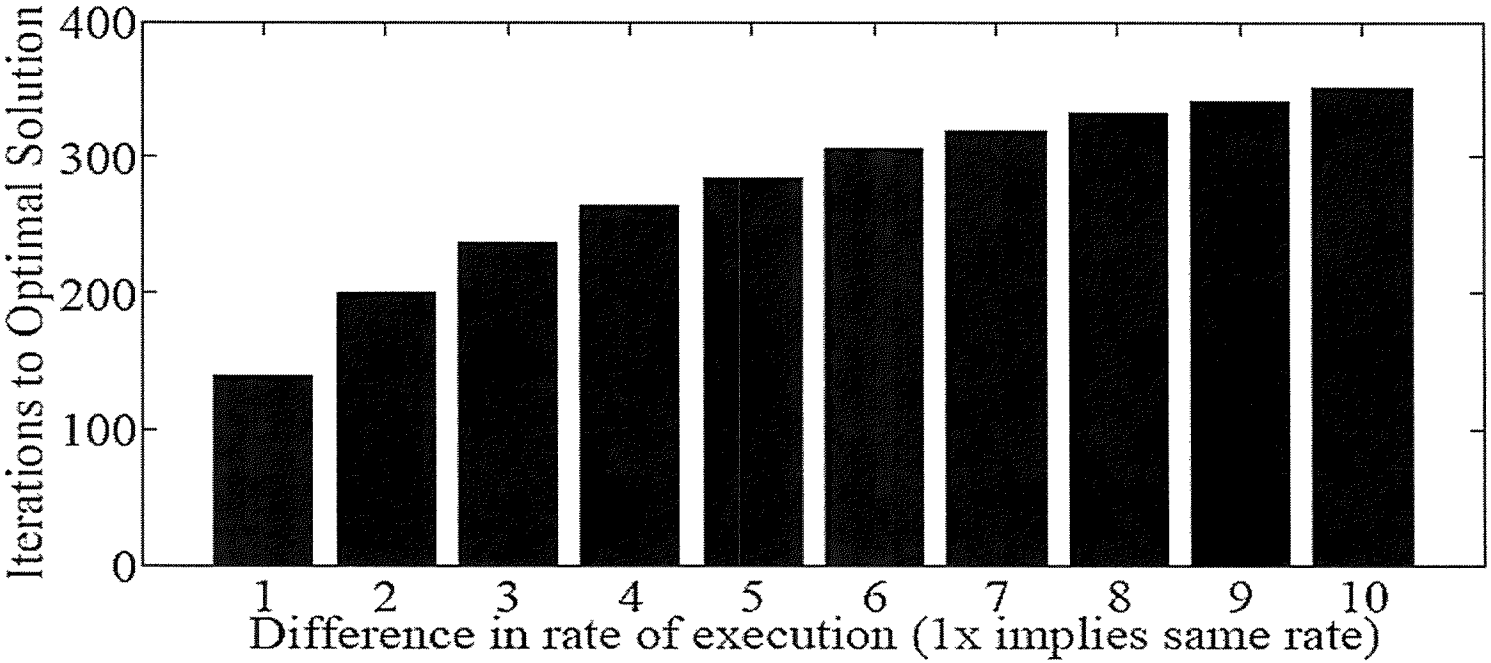
FIG. 13B illustrates iterations required to converge increase with increasing difference in rate of execution at step-size=0.001)

In dynamic network environments, random delays can affect the time it takes for link-state information to reach every node in the network as required by certain embodiments of the method. Note that without synchronized link-state updates, facets of the present invention, e.g., calculating the shortest path tree and $\eta_u^t$ may be affected. There are at least two ways to approach this problem. The first is to allow enough time between successive iterations of the running method so that every node has access to the most up-to-date link-state information. The second is to let the nodes execute the steps of the present invention despite asynchronous link-state updates. It is also possible for asynchronous behavior to arise despite synchronized link-state updates due to some subset of the nodes executing the steps faster than the other nodes. FIG. 13A illustrates data regarding how the present invention may operate in the presence of asynchronous link-state updates and asynchronous executions, using uniform traffic on the Abilene network. In order to simulate asynchronous behavior, the nodes in the network could be numbered and divided into two groups. For asynchronous link-state updates, at every iteration, the even numbered nodes may receive link-states without any delay while the odd numbered nodes may receive link-states from the even numbered nodes after a fixed delay. Consequently, at each execution of the method, the two sets of nodes could have different views of the network link-states. The fixed delay could then be varied to generate the results reported in FIG. 13A. For asynchronous execution of an embodiment of the present invention, the odd numbered nodes could be forced to execute the steps of the present invention slower than the even numbered nodes. The difference in the rate of execution was varied in order to obtain the results reported in FIG. 13B. Different step-sizes could be used to prevent oscillations in the two cases. Despite the asynchronous implementation, the embodiment of the present invention still converges to within 1% of the optimal solution. Additionally, there may be a steady increase in the number of iterations required by the embodiments of the present invention as the delay in propagating the link-states or the difference in the rate of executing the present invention increases.

Figure 14A:
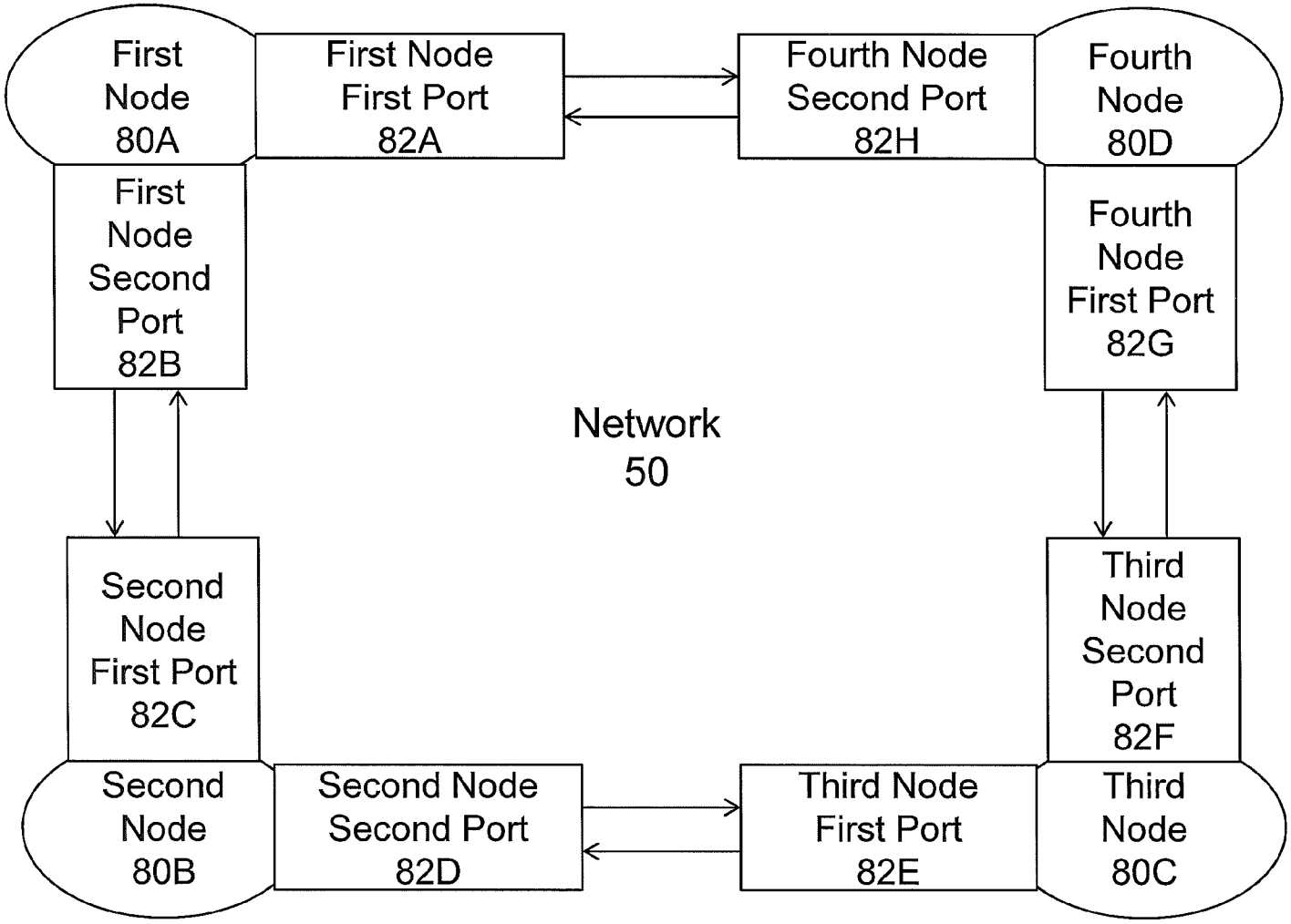
FIG. 14A illustrates a network embodiment of the present invention.

FIG. 14A illustrates the topology of an embodiment of the present invention. More specifically, the illustrated network includes a first node 80A (also called node A), a second node 80B (also called node B), a third node 80C (also called node C), and a fourth node 80D (also called node D), however, a network 50 may include any number of nodes 80. Each network node 80 has two ports 82. Each node 80 may be connected to a NetFPGA 1G platform configured to act as a router.

Figure 14B:
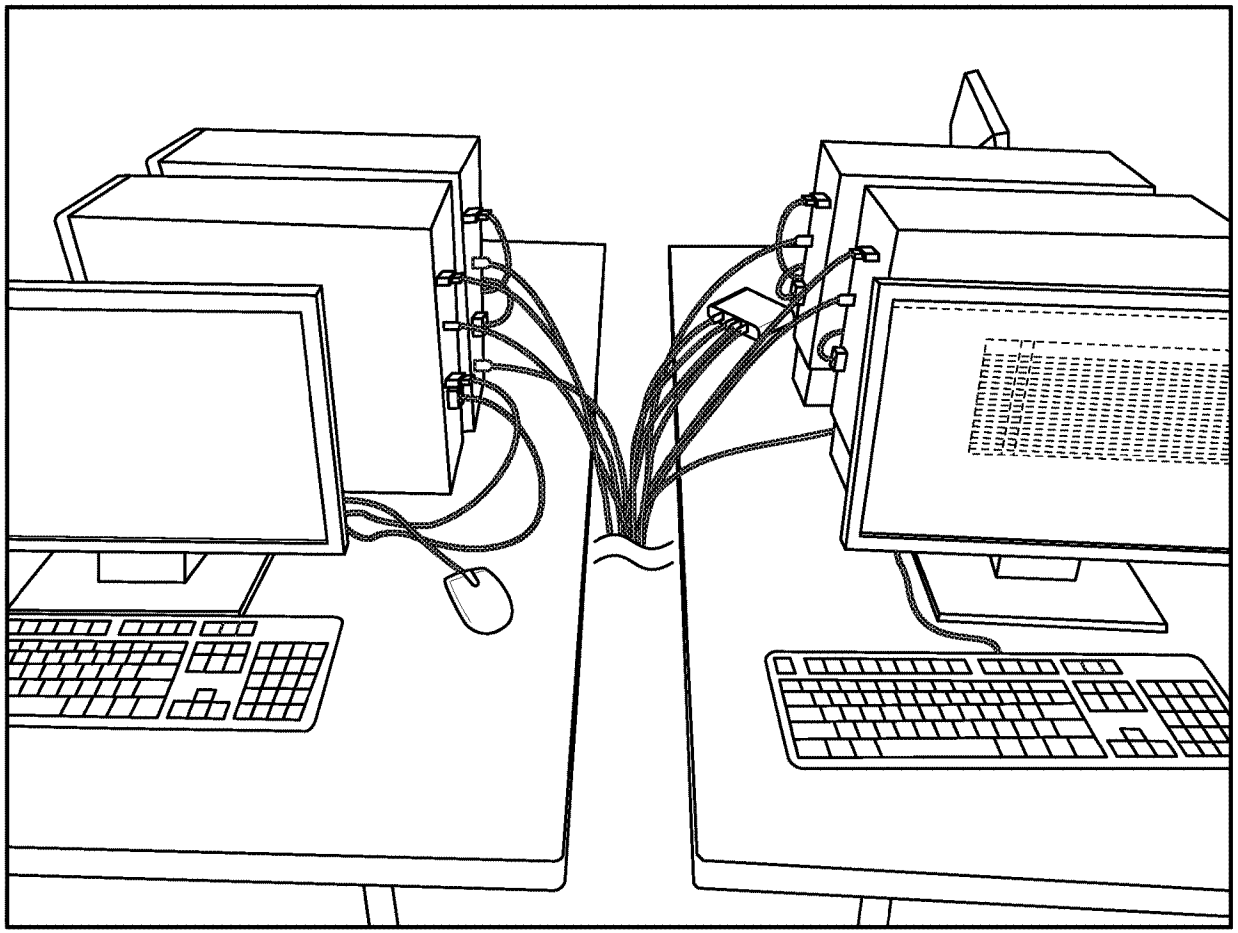
FIG. 14B illustrates a network embodiment of the present invention.

FIG. 14B includes a photograph of a network of computers according to the present invention.

Figure 14C:
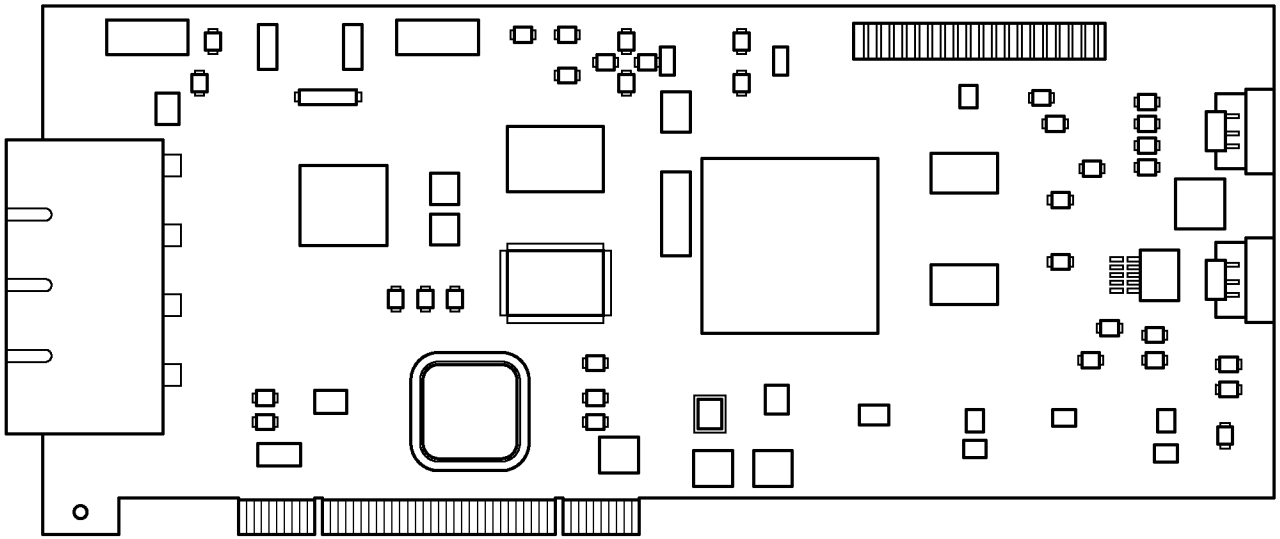
FIG. 14C illustrates a NetFPGA 1G Board according to the present invention.

FIG. 14C illustrates a NetFPGA 1G Board according to the present invention. The NetFPGA is a generally reconfigurable hardware platform configured for high speed networking. A NetFPGA platform includes all of the logic resources, memory and Gigabit Ethernet interfaces to build a complete switch, router, and/or security device. Because the entire datapath may be implemented in hardware, the NetFPGA platform may support back-to-back packets at full Gigabit line rates and has a processing latency measured in only a few clock cycles. An exemplary embodiment of a NetFPGA includes a field programmable gate array logic, Gigabit Ethernet networking ports, static random access memory, double-date rate random access memory, Multi-gigabit I/O, standard PCI form factor, hardware debugging ports, and flexible code.

To quickly achieve multipath functionality in the network 50, packet forwarding decisions may be transferred from the firmware to higher level software which could be easily modified via SCONE (Software Component of NetFPGA). A new table may be added to the software to store the split ratios in addition to the routing table provided in the reference router implementation for the NetFPGA platform. Then a random number generator may be used in conjunction with the routing table and the split ratios table to forward traffic as needed.

Then, the link-state update packets are modified to be broadcast frequently enough to ensure relatively quick convergence of the method and to modify their payload to transmit the link rates. For example, the link-states may be set to broadcast every 250 milliseconds. The network cost function may be represented as $\Sigma_{(u,v)\in E}\hat{f}_{u,v}^{2}$, which results in $2_{u,v}$ as the price of each link. Other components of the method such as retrieving the incoming rate into each board and the outgoing rate on each link can be easily obtained from the NetFPGA registers. Also, Dijkstra's method is changed to run with the new link weights instead of hop-count as it was doing in the Reference Router implementation in SCONE.

Figure 16:
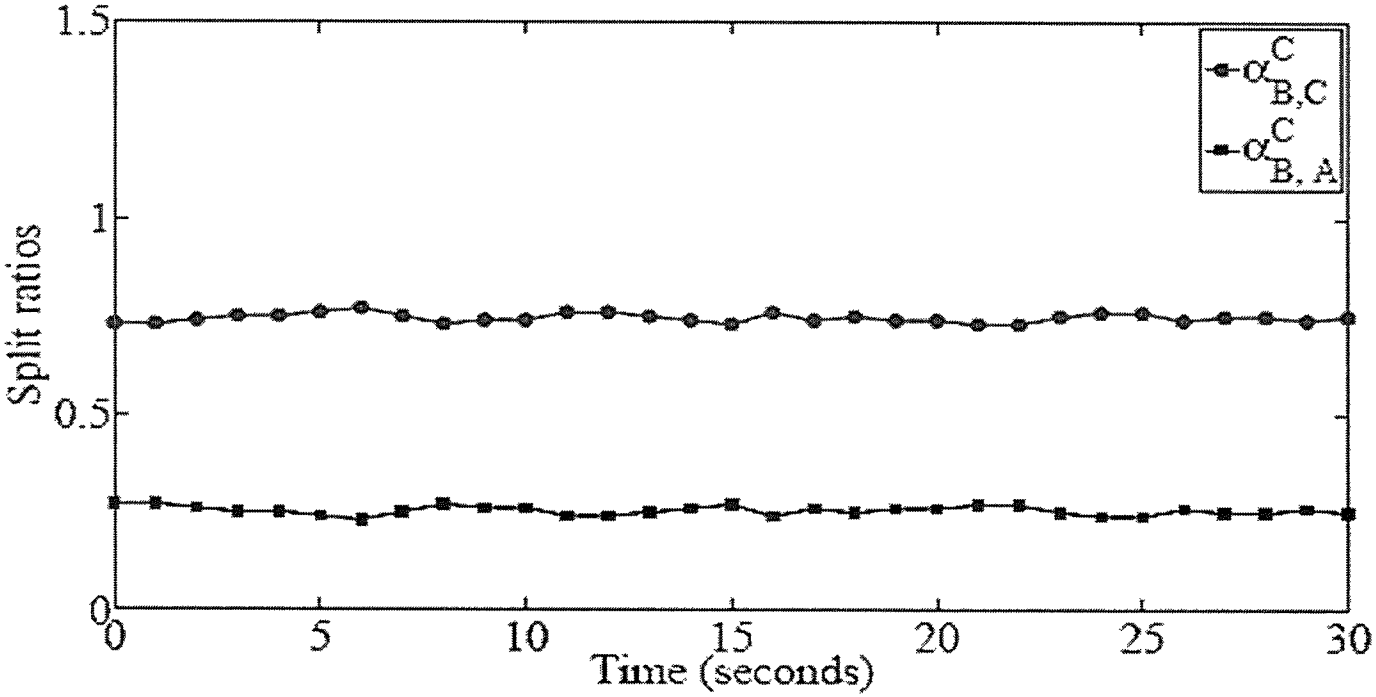
FIG. 16 illustrates the evolution of the split ratios at a node in the network.

To further test the system and methods, video traffic may be sent using, for example, a VLC Media Player as a video server from node B to node C. As described above, the KKT conditions of the multi-commodity flow problem are what permit focusing on shortest paths based on the price and use that to claim optimality of the method. From the KKT conditions of the MCF problem, for the given cost function, it is easy to see that the values of the split ratios at optimality should be $\alpha_{B,A}{}^{C}=0.25$ and $\alpha_{B,C}{}^{C}=0.75$. The evolution of the split ratios in such an embodiment as captured using SCONE, which comes with the NetFPGA platform, is presented in FIG. 16. Clearly, about 25% of the traffic is sent along the longer path through Port 2 while the rest is sent along the shorter path via Port 1.

Figure 15:
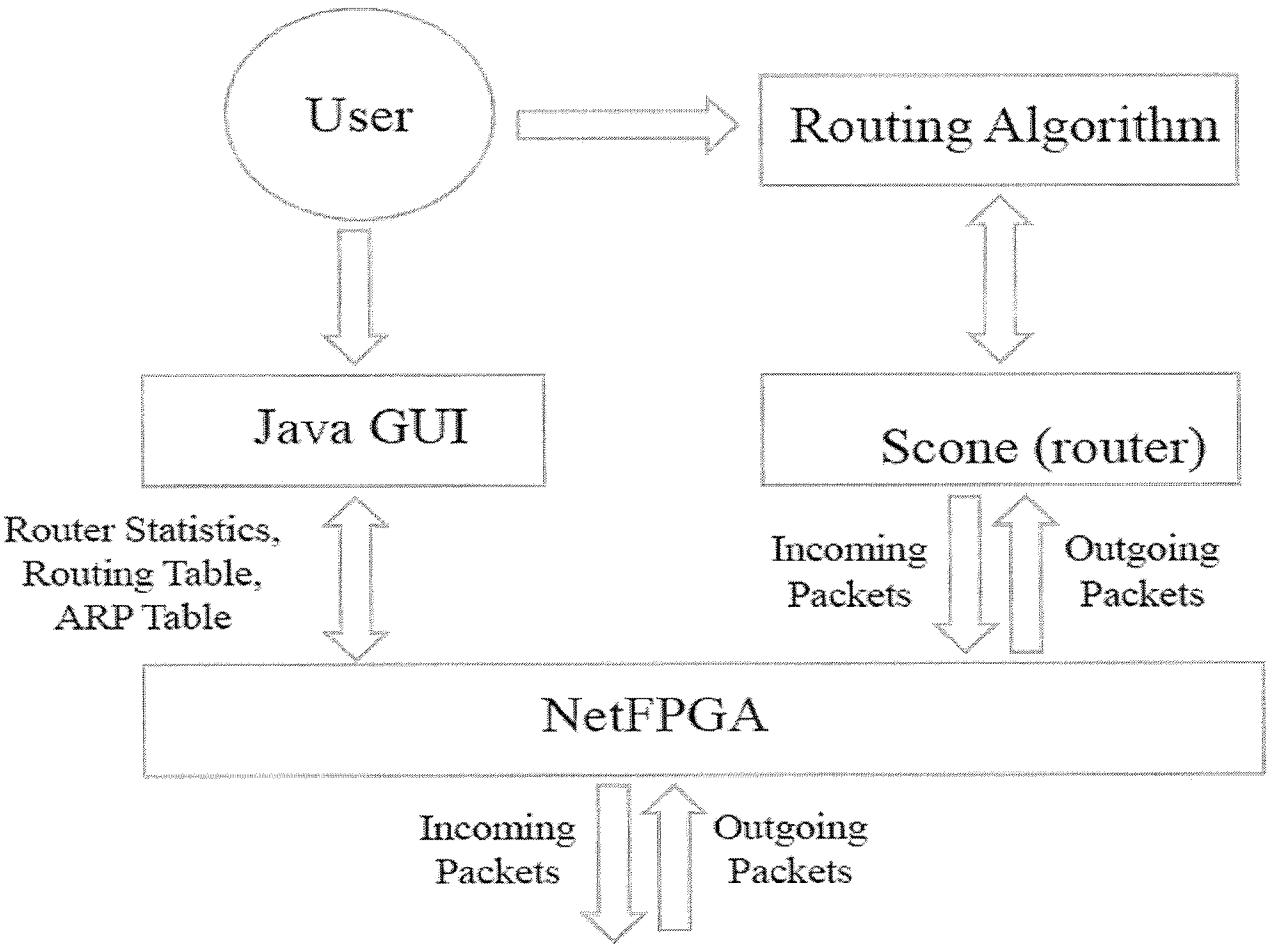
FIG. 15 illustrates another network embodiment of the present invention.
Figure 17:
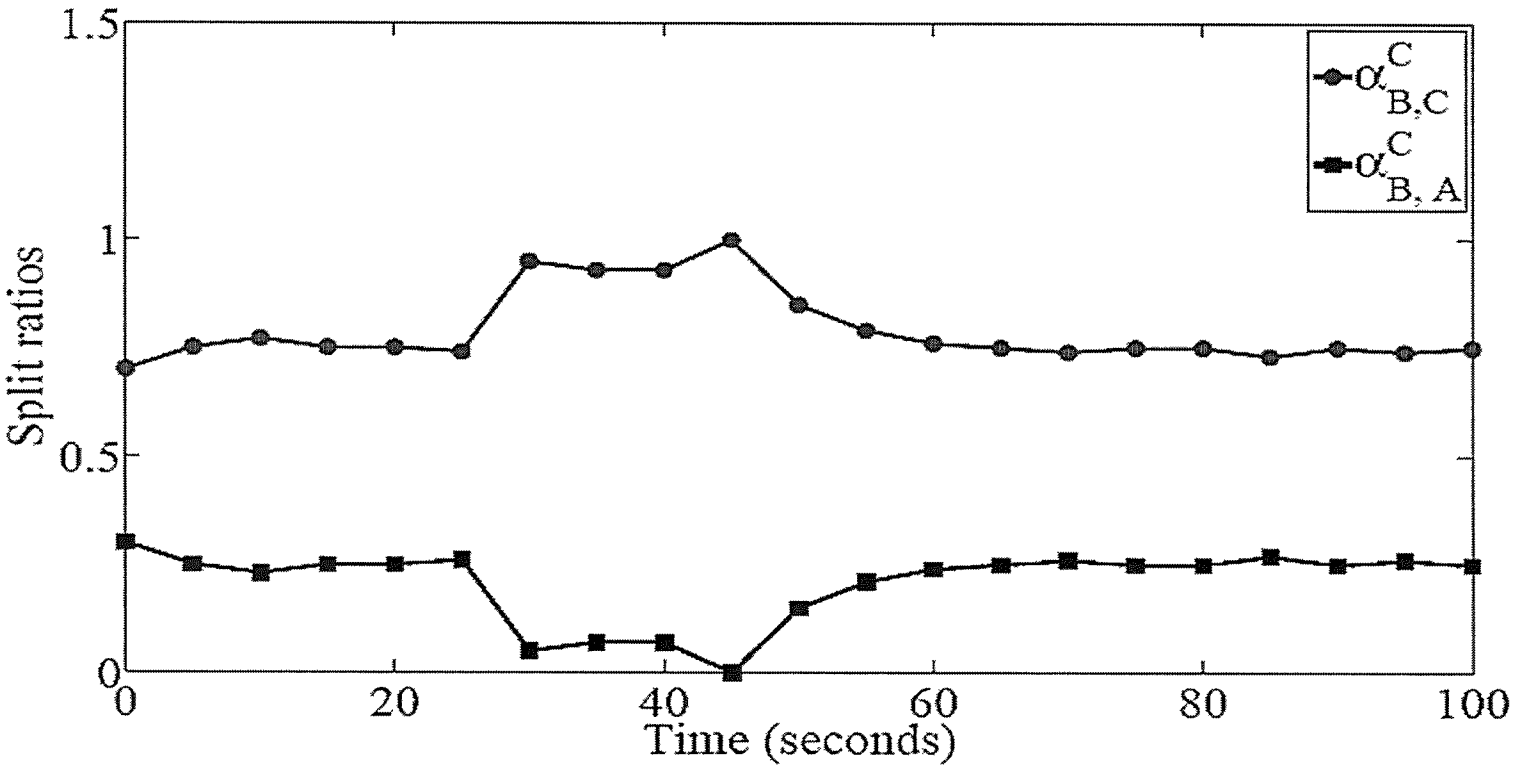
FIG. 17 illustrates the evolution of the split ratios at a node in the network in presence of additional short-term traffic variations.

In the same network 50 embodiment illustrated in FIG. 15, a flow resulted in a clogged link between node A and node D for about 15 seconds (e.g., using the JPerf tool). The evolution of the split ratios from node B to node C when the heavy flow between node A and node D came online and then stopped is presented in FIG. 17. Initially, $\alpha_{B,C}{}^{C}$ increases to 1 before dropping back down to 0.75 once the large flow stops. The extra traffic that can be seen while the flow from node A to node D is in progress is because some of the traffic is routed via (A,B)→(B,C)→(C,D). However, most of the traffic from node B to node C is clearly routed via Port 1.

As stated above, certain embodiments of the present invention include an optimal, link-state, hop-by-hop routing method. Advantageously, certain embodiments of the present invention may facilitate capital savings for ISPs by reducing investments in infrastructure to keep utilization of the networks manageable by current suboptimal procedures). In addition, the present invention may facilitate performance benefits for consumers.

Figure 18:
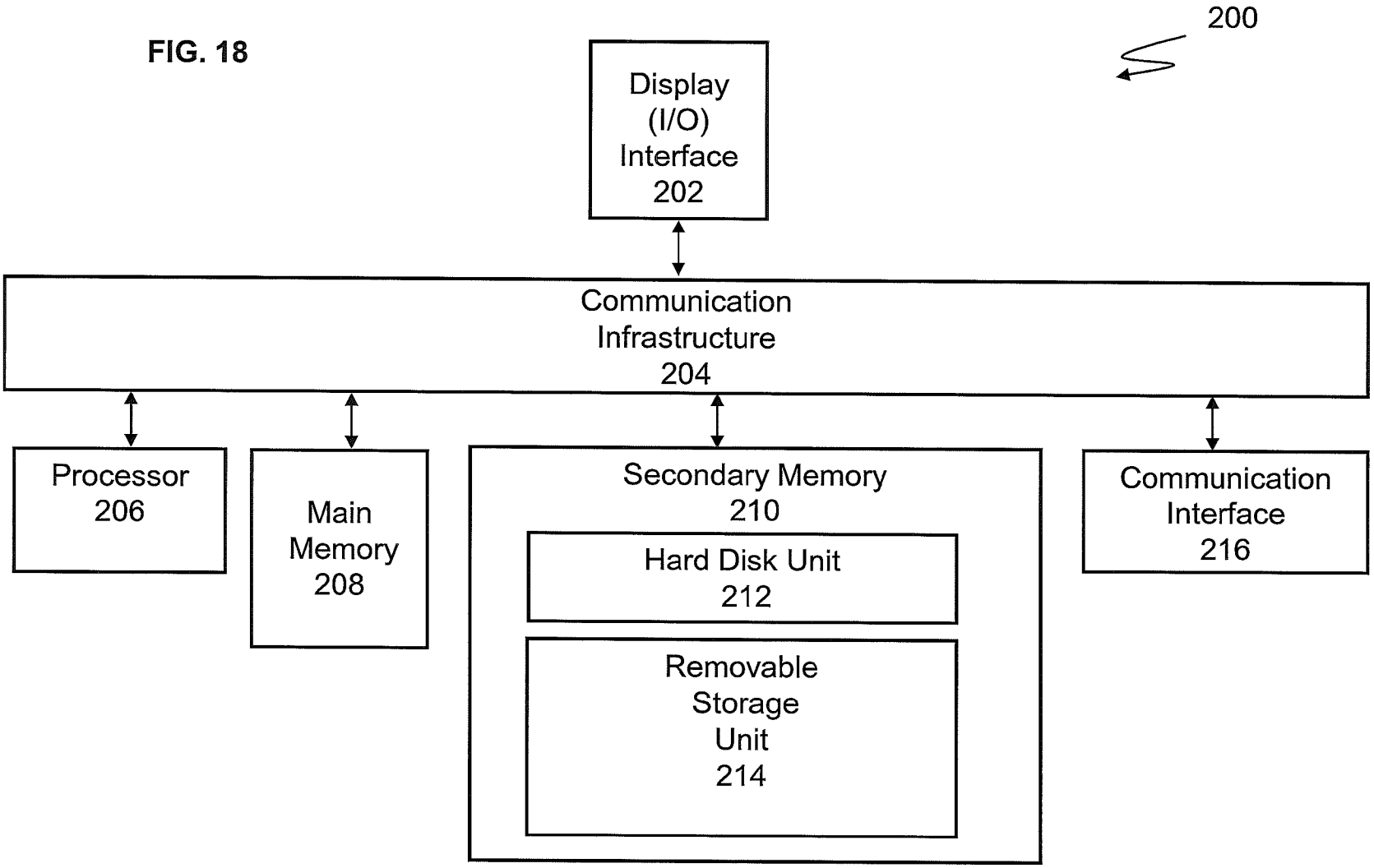
FIG. 18 illustrates an exemplary computer system.

Throughout this application, certain systems and methods have been described. Certain embodiments of the systems include a computer system and certain of the method steps may be implemented by a computer system. FIG. 18 illustrates such an exemplary computer system 200. One or more computer systems 200 may carry out the methods presented herein as computer code.

Computer system 200 includes an input/output display interface 202 connected to communication infrastructure 204—such as a bus —, which forwards data such as graphics, text, and information, from the communication infrastructure 204 or from a frame buffer (not shown) to other components of the computer system 200. The input/output display interface 202 may be, for example, a keyboard, touch screen, joystick, trackball, mouse, monitor, speaker, printer, Google Glass® unit, web camera, any other computer peripheral device, or any combination thereof, capable of entering and/or viewing data.

Computer system 200 includes one or more processors 206, which may be a special purpose or a general-purpose digital signal processor that processes certain information. Computer system 200 also includes a main memory 208, for example random access memory ("RAM"), read-only memory ("ROM"), mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a computer usable storage medium, otherwise referred to as a computer readable storage medium, to store and/or access computer software including computer instructions. Certain embodiments of a computer readable storage medium do not include any transitory signals or waves. For example, computer programs or other instructions may be loaded into the computer system 200 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions.

The computer system 200 described herein may perform any one of, or any combination of, the steps of any of the methods presented herein. It is also contemplated that the methods according to the invention may be performed automatically, or may be invoked by some form of manual intervention.

The computer system 200 of FIG. 18 is provided only for the purposes of illustration, such that the invention is not limited to this specific embodiment. It is appreciated that a person skilled in the relevant art knows how to program and implement the invention using any computer system.

The computer system 200 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 19:
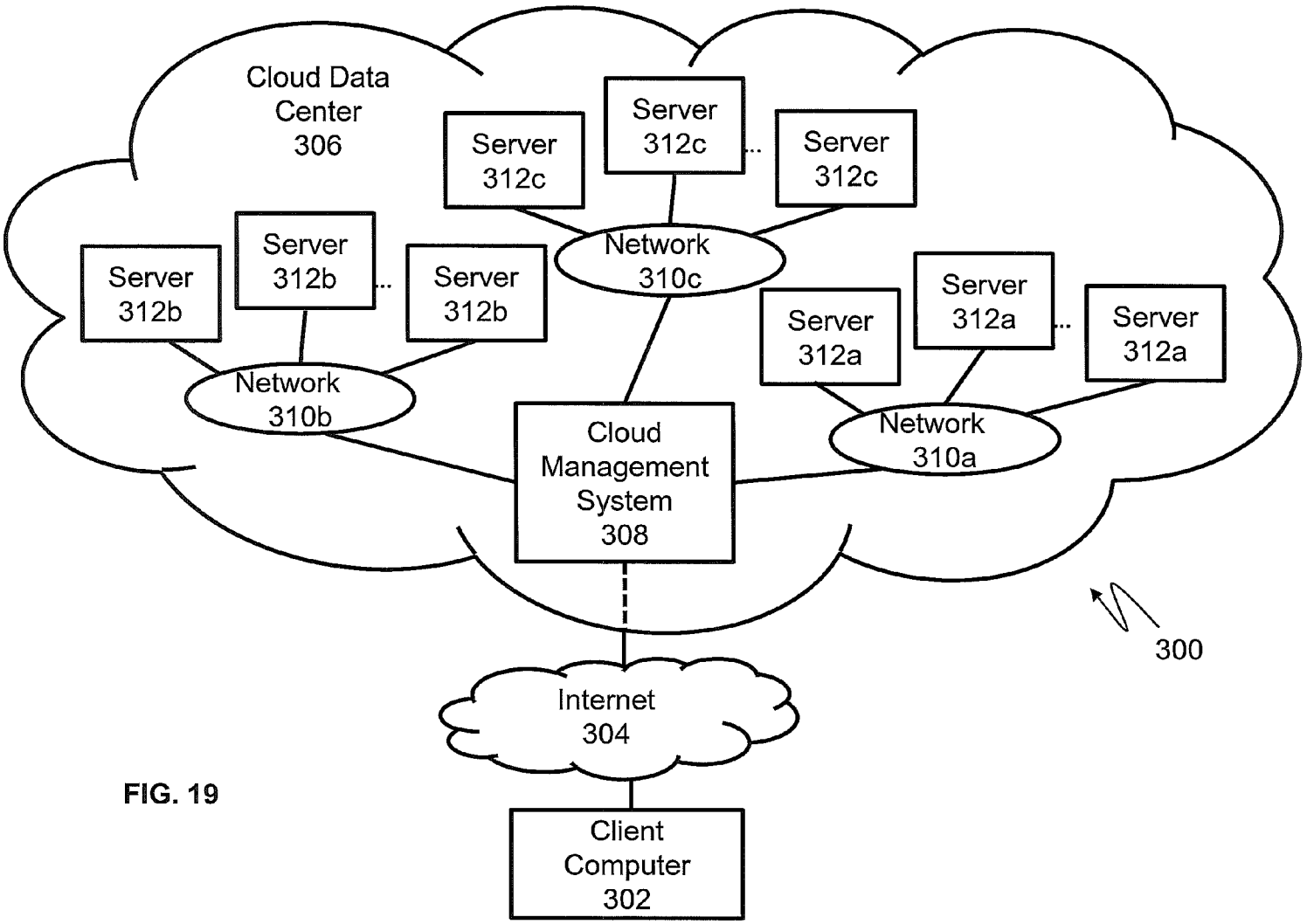
FIG. 19 illustrates an exemplary cloud computing system.

FIG. 19 illustrates an exemplary cloud computing system 300 that may be used to implement the methods according to the present invention. The cloud computing system 300 includes a plurality of interconnected computing environments. The cloud computing system 300 utilizes the resources from various networks as a collective virtual computer, where the services and applications can run independently from a particular computer or server configuration making hardware less important.

Specifically, the cloud computing system 300 includes at least one client computer 302. The client computer 302 may be any device through the use of which a distributed computing environment may be accessed to perform the methods disclosed herein, for example, a traditional computer, portable computer, mobile phone, personal digital assistant, tablet to name a few. The client computer 302 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 302 also includes a communications interface, for example, a modem, a network interface (such as an Ethernet card), a communications port, a PCMCIA slot and card, wired or wireless systems, etc. The communications interface allows communication through transferred signals between the client computer 302 and external devices including networks such as the Internet 304 and cloud data center 306. Communication may be implemented using wireless or wired capability such as cable, fiber optics, a phone line, a cellular phone link, radio waves or other communication channels.

The client computer 302 establishes communication with the Internet 304 —specifically to one or more servers—to, in turn, establish communication with one or more cloud data centers 306. A cloud data center 306 includes one or more networks 310a, 310b, 310c managed through a cloud management system 308. Each network 310a, 310b, 310c includes resource servers 312a, 312b, 312c, respectively. Servers 312a, 312b, 312c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 308 can comprise a dedicated or centralized server and/or other software, hardware, and network tools to communicate with one or more networks 310a, 310b, 310c, such as the Internet or other public or private network, with all sets of resource servers 312a, 312b, 312c. The cloud management system 308 may be configured to query and identify the computing resources and components managed by the set of resource servers 312a, 312b, 312c needed and available for use in the cloud data center 306. Specifically, the cloud management system 308 may be configured to identify the hardware resources and components such as type and amount of processing power, type and amount of memory, type and amount of storage, type and amount of network bandwidth and the like, of the set of resource servers 312a, 312b, 312c needed and available for use in the cloud data center 306. Likewise, the cloud management system 308 can be configured to identify the software resources and components, such as type of Operating System ("OS"), application programs, and the like, of the set of resource servers 312a, 312b, 312c needed and available for use in the cloud data center 306.

The present invention is also directed to computer products, otherwise referred to as computer program products, to provide software to the cloud computing system 300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 300 of FIG. 19 is provided only for the purposes of illustration and does not limit the invention to this specific embodiment. It is appreciated that a person skilled in the relevant art knows how to program and implement the invention using any computer system or network architecture.

Certain embodiments of the present invention also may be implemented by utilizing software defined networks. In such embodiments, the system and methods may exist on the application layer in the context of software defined networking.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for improving routing of a commodity through a network, comprising:

a processor;

a main memory in communication with the processor via a communication infrastructure and storing instructions that, when executed by the processor, cause the processor to:

recognize two or more nodes in the network;

ascertain one or more links between the two or more nodes in the network;

assign a price value to each of the one or more links between the two or more nodes in the network;

receive a request for routing at least one unit of the commodity from a source node to a destination node in the network; and

[compute an optimal next node subsequent to the source node, wherein a split ratio applied] *route the at least one unit of the commodity from the source node to the destination node in the network, wherein the routing of the at least one unit of the commodity is based at least in part on applying a dynamically adjusted split ratio weighting factor in at least one of the two or more nodes in a pathway between the source node and the destination node in the network, the split ratio weighting factor being computed* in *the* at least one of the two or more nodes [is dynamically adjusted, a split ratio weighting factor expressed as,] *in the pathway between the source node and the destination node in the network according to:*

$$\text{if } r_u^t > 0,\ \dot{\alpha}_{u,v}^t = -\frac{\alpha_{u,v}^t \delta}{\eta_u^t r_u^t},\ v \neq \bar{v}$$

$$\left[\dot{\alpha}_{u,v}^t = -\sum_{v:(u,v)\in E, v\neq\bar{v}} \dot{\alpha}_{u,v}^t\right] \dot{\alpha}_{u,\bar{v}}^t = -\sum_{v:(u,v)\in E, v\neq\bar{v}} \dot{\alpha}_{u,v}^t$$

$$\textit{else if } r_u^t = 0,\ \alpha_{u,v}^t = 0,\ v \neq \bar{v}$$

-continued $$\alpha_{u,\bar{v}}^t = 1$$

wherein η represents *a product of* a number of branches *at junctions,* u represents a source node, t represents a destination node, α represents a split ratio, r represents a rate of incoming traffic, δ represents a rate traffic shifts between the one or more links, and $(u, \bar{v}) \in E$ and $(u, \bar{v})$ is part of a shortest path to t from u*; and*

*wherein the network is an electronic data network.*

2. The system of claim 1, wherein the [compute step includes] *split ratio weighting factor is further computed by*:

using Dijkstra's method with tie-breaking based on a node index;

surveying a shortest pathway from the source node to the destination node;

initializing the branch cardinality $(\eta_u^t)$for the shortest pathway from the source node to the destination node; and at every subsequent node, setting $\eta_u^t \leftarrow \eta_u^t b$, wherein [η represents a number of branches, u represents a source node, t represents a destination node, and] b represents a number of branches from a particular junction.

3. The system of claim 1, wherein the commodity is an information packet.

[4. The system of claim 1, wherein the network is an electronic data network.]

5. [The system of claim 1,] *A system for improving routing of a commodity through a network, comprising:*

*a processor;*

*a main memory in communication with the processor via a communication infrastructure and storing instructions that, when executed by the processor, cause the processor to:*

*recognize two or more nodes in the network;*

*ascertain one or more links between the two or more nodes in the network;*

*assign a price value to each of the one or more links between the two or more nodes in the network:*

*receive a request for routing at least one unit of the commodity from a source node to a destination node in the network; and*

*route the at least one unit of the commodity from the source node to the destination node in the network, wherein the routing of the at least one unit of the commodity is based at least in part on applying a dynamically adjusted split ratio weighting factor in at least one of the two or more nodes in a pathway between the source node and the destination node in the network, the split ratio weighting factor being computed in the at least one of the two or more nodes in the pathway between the source node and the destination node in the network according to:*

$$\textit{if } r_u^t > 0,\ \dot{\alpha}_{u,v}^t = -\frac{\alpha_{u,v}^t \delta}{\eta_u^t r_u^t},\ v \neq \bar{v}$$

$$\dot{\alpha}_{u,\bar{v}}^t = -\sum_{v:(u,v)\in E, v\neq\bar{v}} \dot{\alpha}_{u,v}^t$$

$$\textit{else if } r_u^t = 0,\ \alpha_{u,v}^t = 0,\ v \neq \bar{v}$$

$$\alpha_{u,\bar{v}}^t = 1$$

*wherein η represents a product of a number of branches at junctions, u represents a source node, t represents a*

*destination node, α represents a split ratio, r represents a rate of incoming traffic, δ represents a rate traffic shifts between the one or more links, and* $(u, \bar{v}) \in E$ *and* $(u, \bar{v})$ *is part of a shortest path to t from u; and* wherein each of the two or more nodes is a router.

6. The system of claim 1, wherein each of the two or more nodes is a computer system.

[7. A method for routing electronic data packets in a network, the method comprising:

one or more processors executing a process to:

identify a plurality of network nodes in a network, wherein packets are sent between a source node of the plurality of network nodes, and a destination node of the plurality of network nodes;

for each packet, performing a calculation of a split ratio at each node on an ongoing basis, wherein the split ratio comprises a selection of which node-to-node route each packet takes to go from a source destination node to a destination node, wherein calculating the split ratio at each node comprises, taking into account each node's current knowledge of shortest paths to a destination node for a packet; and decreasing a number of packets forwarded to a node that is not in a shortest path to the destination node, wherein the rate of decrease is proportional to a value of a current split ratio.]

[8. The method claim 7, wherein the one or more processors comprise one or more routers associated with network nodes, and wherein not all of the routers are required to perform the process.]

[9. The method of claim 7 wherein performing the calculation of the split ratio at each node comprises receiving network link state information, and does involve information regarding demand at nodes.]

[10. The method of claim 9, wherein the link state information comprises one or more of a number of packets between nodes, and a number of packets per unit of distance between nodes.]

[11. The method of claim 7, wherein the process comprises calculating a weighting factor for the split ratio at each node for each possible next node.]

[12. The method of claim 7, wherein the process comprises iteratively modifying packet forwarding at each node, comprising:

a node determining whether there are packets currently destined for a given destination node;

if there are no packets currently destined for the given destination node, the node forwarding newly received packets to the given destination node along a shortest path;

if there are packets currently destined for the given destination node, the node adjusting a number of packets forwarded to the given destination node.]

[13. The method of claim 12, wherein adjusting the number of packets comprises reducing a number of packets along non-shortest routes and increasing the number of packets along currently calculated shortest paths.]

[14. The method of claim 13, wherein adjusting is performed iteratively until an optimal route is obtained.]

[15. The method of claim 8, wherein the performance of the process by a subset of the one or more routers, including one of the one or more routers, improves traffic in the network.]

[16. The method of claim 7 wherein the one or more processors comprise one or more routers associated with network nodes, and a central processor, and wherein the central processor performs the process for each node and transmits results to each node for use in routing network traffic.]

*17. A system comprising:*

*at least one node including a link-state router (LSR), wherein the at least one node is coupled to a network including a plurality of nodes coupled via a plurality of links;*

*wherein the LSR is configured to include a plurality of routing components;*

*wherein the LSR is configured to receive feedback including link state information of the plurality of links;*

*wherein at least one of the plurality of routing components is configured:*

*to use the link state information to characterize current knowledge of a shortest path to a destination node in the network;*

*to select a split ratio that incrementally increases traffic along a first one of the plurality of links that corresponds to the shortest path to the destination node and incrementally decreases traffic along at least a second one of the plurality of links that corresponds to at least one other path to the destination node; and*

*to determine a best route through the network by determining, using the selected split ratio, at least one optimal subsequent node of the plurality of nodes;*

*wherein the determination of the at least one optimal subsequent node is repeated at each optimal subsequent node, based at least in part on split ratios selected at each optimal subsequent node using current knowledge of the shortest path to the destination node at each optimal subsequent node, until the destination node is reached; and*

*wherein the LSR is configured to control routing of traffic using the best route.*

*18. The system of claim 17, wherein the at least one routing component includes at least one objective function, wherein resultant values generated by the at least one objective function adaptively characterize the network.*

*19. The system of claim 18, wherein the determination of the best route includes applying the at least one objective function to the link state information.*

*20. The system of claim 19, wherein the adaptive characterization of the network comprises recognizing changes in parameters of the network based at least in part on feedback of the link state information of the plurality of links, and adapting the characterization of the network in response to the changes in the parameters.*

*21. The system of claim 20, wherein the at least one routing component dynamically adapts to changes in traffic on the network.*

*22. The system of claim 20, wherein the parameters include changes in network topology.*

*23. The system of claim 20, wherein the parameters include variations in network traffic.*

*24. The system of claim 20, wherein the parameters include the link state information.*

*25. The system of claim 24, wherein the link state information comprises a numerical description of a state of at least one of the plurality of links.*

*26. The system of claim 24, wherein the link state information comprises a valuation of an amount of traffic on at least one of the plurality of links.*

27. The system of claim 24, wherein the link state information comprises one or more of a number of packets between nodes, and a number of packets per unit of distance between nodes.

28. The system of claim 20, wherein the adaptive characterization of the network using the feedback of the link state information obviates pre-assigned network traffic information in order to compute link weights.

29. The system of claim 20, wherein the adaptive characterization of the network obviates pre-assigned network traffic information in order to begin routing traffic using the best route.

30. The system of claim 20, wherein the control of the routing by the at least one routing component based at least in part on the adaptive characterization of the network obviates routing based at least in part on coordination of the at least one node with others of the plurality of nodes.

31. The system of claim 17, wherein the at least one node including the LSR includes a single node including the LSR.

32. The system of claim 17, wherein the at least one node including the LSR includes two or more nodes each including the LSR.

33. The system of claim 17, wherein the at least one node including the LSR includes the plurality of nodes each including the LSR.

34. The system of claim 17, wherein the link state information is received at the LSR of the at least one node asynchronously relative to any other node of the plurality of nodes.

35. The system of claim 19, wherein the applying of the at least one objective function to the link state information at the at least one node is asynchronous relative to any other node of the plurality of nodes.

36. The system of claim 19, wherein the link state information includes updated link state information.

37. The system of claim 36, wherein the determination of the best route includes dynamically adjusting the route at the at least one node in response to the updated link state information.

38. The system of claim 37, wherein the dynamic adjusting is performed iteratively until an optimal route is obtained, wherein the optimal route is a route that minimizes the objective function.

39. The system of claim 38, wherein the dynamic adjusting of an iteration includes applying the at least one objective function to the updated link state information received during the iteration.

40. The system of claim 39, wherein the dynamic adjusting comprises reducing a number of packets along non-shortest paths to the destination node.

41. The system of claim 39, wherein the dynamic adjusting comprises increasing a number of packets along the shortest path to the destination node.

42. The system of claim 39, wherein the dynamic adjusting comprises, for each packet to be routed to the destination node during each iteration, selection of a route each packet takes through the network using the selected split ratio.

43. The system of claim 42, wherein the dynamic adjusting comprises decreasing a number of packets forwarded to a node that is not in a shortest path to the destination node.

44. The system of claim 43, wherein the rate of decrease is proportional to a value of the selected split ratio.

45. The system of claim 19, wherein the best route is determined by minimizing the at least one objective function using the link state information.

46. The system of claim 45, wherein the best route is an optimal route between a source node and the destination node of the plurality of nodes.

47. The system of claim 46, wherein the best route comprises a lowest cost route through the network.

48. The system of claim 46, wherein the best route comprises a shortest route through the network.

49. The system of claim 19, wherein the at least one routing component is configured to iteratively apply in real time the at least one objective function to the link state information and generate a plurality of link weights comprising a link weight for each link of the plurality of links.

50. The system of claim 49, wherein the at least one routing component is configured to determine at least one route for tenant traffic flow according to the plurality of link weights.

51. The system of claim 50, wherein the control of the routing of the tenant traffic flow comprises continually adapting the at least one route in response to changes in the link state information as processed by the at least one objective function.

52. The system of claim 17, wherein the control of the routing comprises controlling routing of traffic to a next node of the best route via a single path.

53. The system of claim 17, wherein the control of the routing comprises controlling routing of traffic to a next node of the best route via a plurality of paths.

54. The system of claim 17, wherein the control of the routing at the at least one node is independent of routing decisions of any other node of the plurality of nodes.

55. The system of claim 17, wherein the LSR is configured to operate in conjunction with a plurality of routing systems of other nodes of the plurality of nodes.

56. The system of claim 17, wherein the at least one node includes a control plane that is separate and distinct from a data plane.

57. The system of claim 56, wherein the control plane is distributed among the plurality of nodes.

58. The system of claim 56, wherein the control plane comprises at least one of software and hardware.

59. The system of claim 56, wherein the data plane comprises at least one of software and hardware.

60. The system of claim 17, wherein the at least one routing component includes a software-defined algorithm executing in the at least one node, wherein the at least one routing component is configured to interoperate with other network components of the at least one node.

61. The system of claim 60, wherein the other network components of the at least one node include one or more of logic components, interconnect components, ports, memory components, input/output components, and algorithms.

62. The system of claim 17, wherein at least one routing component is configured to use the link state information to adaptively characterize the network.

63. The system of claim 62, wherein at least one routing component is configured to iteratively determine the best route through the network based at least in part on the adaptive characterization.

64. The system of claim 17 wherein selecting the split ratio comprises computing a split ratio weighting factor expressed as:

$$\text{if } r_u^t > 0,\ \delta_{u,v}^t = -\frac{\alpha_{u,v}^t \delta}{\eta_u^t r_u^t},\ v \neq \bar{v}$$

*-continued*

$$\dot{\alpha}^t_{u,\bar{v}} = -\sum_{v:(u,v)\in\mathbb{E},v\neq\bar{v}} \dot{\alpha}^t_{u,v}$$

$$\text{else if } r^t_u = 0,\ \alpha^t_{u,v} = 0,\ v \neq \bar{v}$$

$$\alpha^t_{u,\bar{v}} = 1$$

*wherein* $\eta$ *represents a product of a number of branches at junctions, u represents a source node, t represents a destination node,* $\alpha$ *represents the split ratio, r represents a rate of incoming traffic,* $\delta$ *represents a rate traffic shifts between the plurality of links, and* $(u, \bar{v}) \in E$ *and* $(u, \bar{v})$ *is part of a shortest path to t from u.*

*65. The system of claim 18, wherein computing the split ratio weighting factor comprises:*

*using Dijkstra's method with tie-breaking based on a node index;*

*surveying the shortest path from the source node to the destination node;*

*initializing the branch cardinality* $(\eta_u{}^t)$ *for the shortest path from the source node to the destination node; and*

*at every subsequent node, setting* $\eta_u{}^t \leftarrow \eta_u{}^t b$, *wherein* $\eta$ *represents a number of branches, u represents a source node, t represents a destination node, and b represents a number of branches from a particular junction.*

*66. The system of claim 17, wherein the traffic comprises one or more information packets.*

*67. The system of claim 17, wherein the network is an electronic data network.*

*68. The system of claim 17, wherein each of the plurality of nodes is a router.*

*69. The system of claim 17, wherein each of the plurality of nodes is a computer system.*

* * * * *